United States Patent
Steinhoff et al.

(10) Patent No.: US 9,663,297 B1
(45) Date of Patent: May 30, 2017

(54) LINKAGE ASSEMBLY FOR SELF-SUPPORTING CONVEYOR BELT

(71) Applicant: Ashworth Bros., Inc., Fall River, MA (US)

(72) Inventors: Paul Steinhoff, Stephens City, VA (US); Robert W. Burgess, Fairfax, VA (US); Darroll Joseph Neely, Gerrardstown, WV (US)

(73) Assignee: Ashworth Bros., Inc., Fall River, MA (US)

( * ) Notice: Subject to any disclaimer, the term of this patent is extended or adjusted under 35 U.S.C. 154(b) by 0 days.

(21) Appl. No.: 15/071,023

(22) Filed: Mar. 15, 2016

(51) Int. Cl.
*B65G 17/38* (2006.01)
*B65G 13/02* (2006.01)
*B65G 17/06* (2006.01)

(52) U.S. Cl.
CPC ......... *B65G 17/063* (2013.01); *B65G 17/385* (2013.01)

(58) Field of Classification Search
CPC ............................ B65G 17/063; B65G 17/385
USPC .......................................... 198/778, 779, 852
See application file for complete search history.

(56) References Cited

U.S. PATENT DOCUMENTS

| | | | |
|---|---|---|---|
| 2,987,166 A * | 6/1961 | Gray ...................... | B65G 37/00 198/586 |
| 3,225,898 A | 12/1965 | Roinstad | |
| RE30,035 E | 6/1979 | Miller | |
| 4,266,661 A | 5/1981 | Andersson | |
| 4,561,537 A * | 12/1985 | Dos Santos ............ | B65G 15/16 198/626.4 |
| 4,748,907 A * | 6/1988 | Schermutzki .......... | B30B 5/067 100/153 |
| 5,141,102 A * | 8/1992 | Roinestad ............ | B65G 17/064 198/778 |
| 5,183,149 A | 2/1993 | Wierman et al. | |
| 5,228,557 A * | 7/1993 | Lago ..................... | B65G 21/18 198/778 |
| 5,350,056 A | 9/1994 | Hager | |
| 5,788,056 A * | 8/1998 | Clopton ................. | B65G 13/10 198/779 |
| 5,934,448 A * | 8/1999 | Kucharski ............ | B65G 17/064 198/778 |
| 6,029,797 A * | 2/2000 | Olsson ................... | B65G 17/42 198/778 |
| 6,237,750 B1 * | 5/2001 | Damkjaer ............ | B65G 17/064 198/778 |

(Continued)

FOREIGN PATENT DOCUMENTS

EP 0739830 A1 10/1996
EP 1118559 A1 7/2001

*Primary Examiner* — Douglas Hess
(74) *Attorney, Agent, or Firm* — Plumsea Law Group, LLC

(57) ABSTRACT

A conveyor belt includes a self-supporting linkage assembly and a plurality of transverse elements configured to travel along a longitudinal direction. The transverse elements are interconnected by the linkage assembly. The conveyor belt also includes a biasing member. The linkage assembly includes a first link and a second link. The first and second links are configured to move relative to each other between an engaged position and a disengaged position. The biasing member is configured to bias the first and second links toward the engaged position. The first and second links, when in the engaged position, are constrained against rotation relative to each other. The first and second links, when in the disengaged position, are configured to rotate relative to each other.

45 Claims, 20 Drawing Sheets

(56) References Cited

U.S. PATENT DOCUMENTS

| | | | |
|---|---|---|---|
| 6,523,680 B2 | 2/2003 | Guldenfels | |
| 6,695,128 B2 | 2/2004 | Palmaer et al. | |
| 7,096,778 B2 * | 8/2006 | Sebastian | B30B 5/067 |
| | | | 100/151 |
| 7,178,662 B2 | 2/2007 | Olsson et al. | |
| 7,841,461 B2 * | 11/2010 | Nguyen | B65G 21/14 |
| | | | 198/781.03 |
| 8,162,134 B2 * | 4/2012 | Krause | B65G 17/08 |
| | | | 198/779 |
| 2013/0140152 A1 | 6/2013 | Neely et al. | |

* cited by examiner

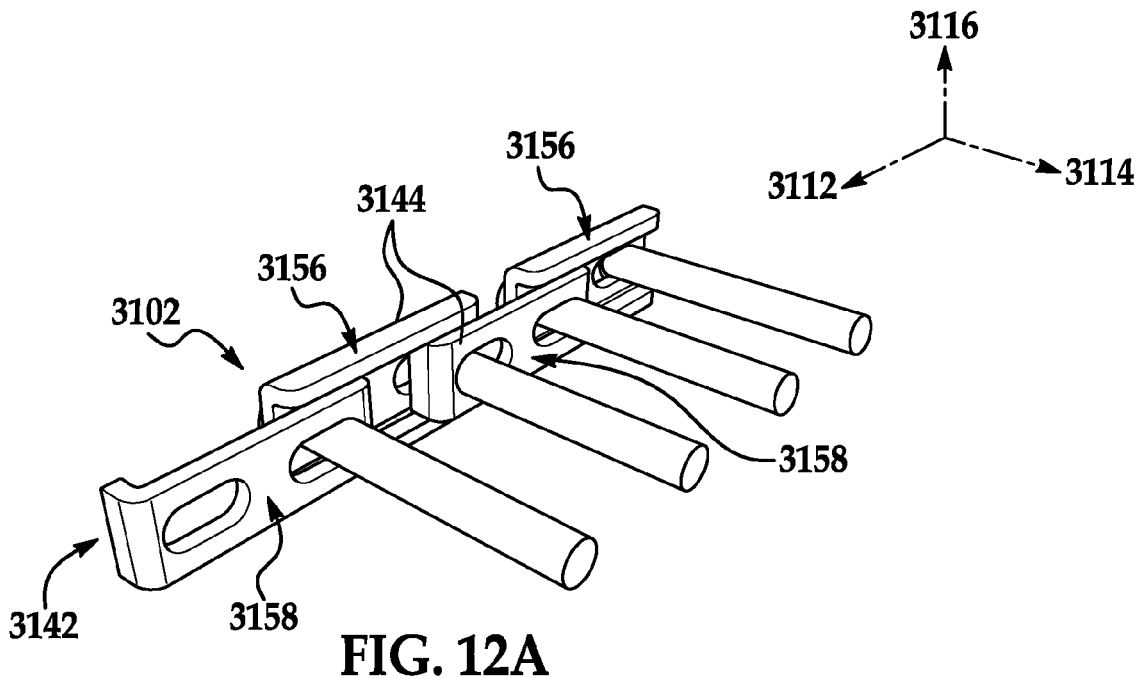
FIG. 12A
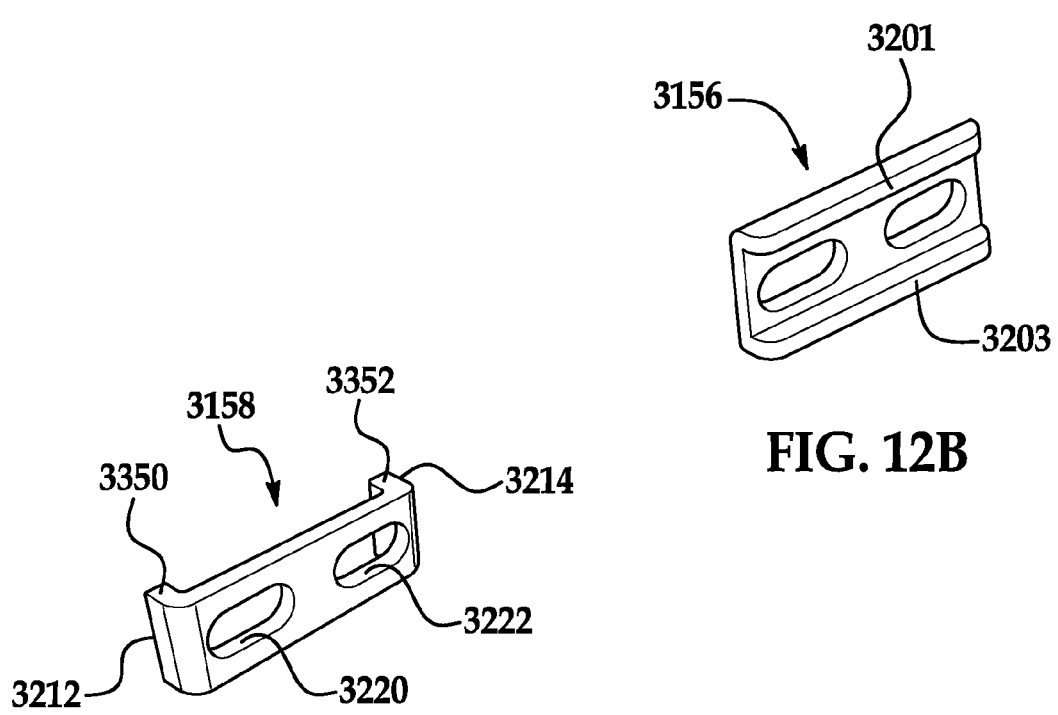
FIG. 12B
FIG. 12C

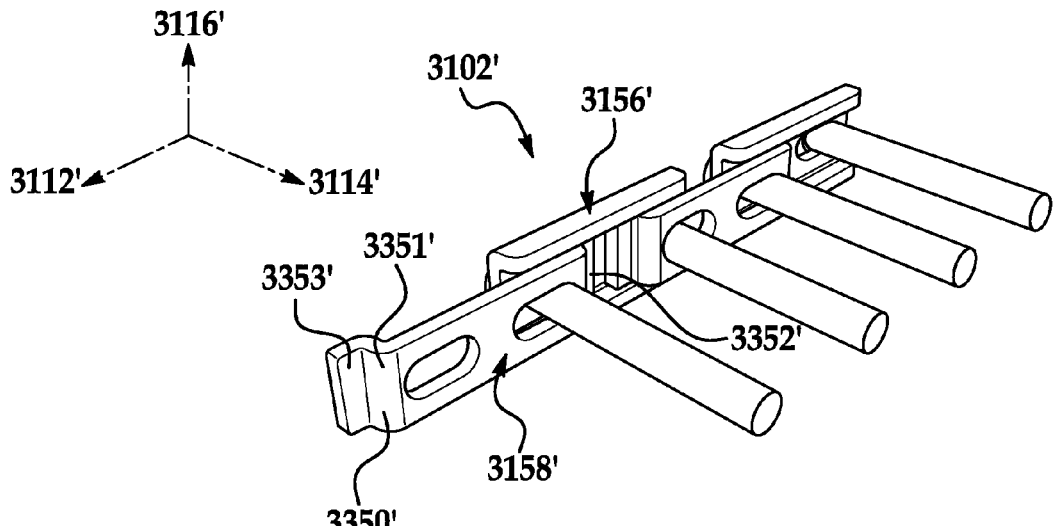
FIG. 13
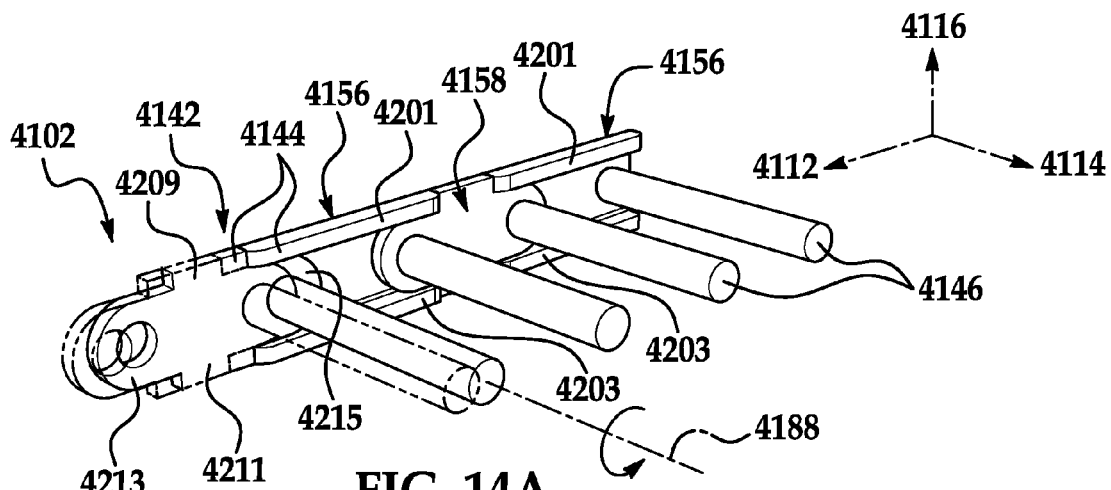
FIG. 14A
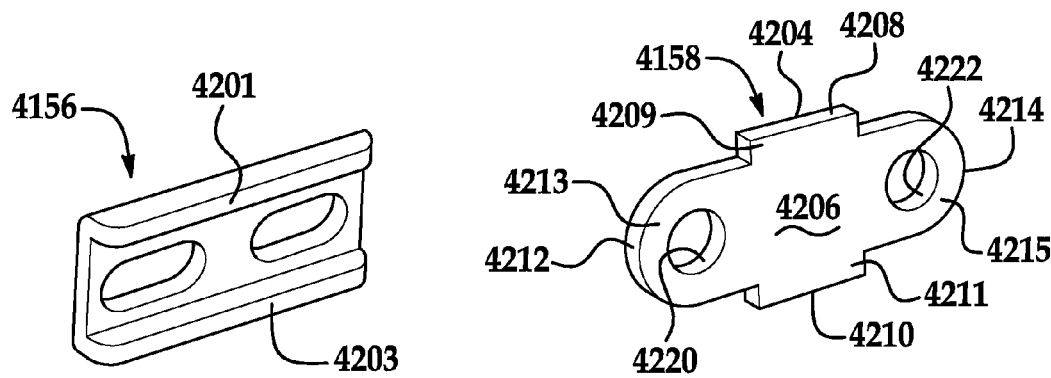
FIG. 14B
FIG. 14C

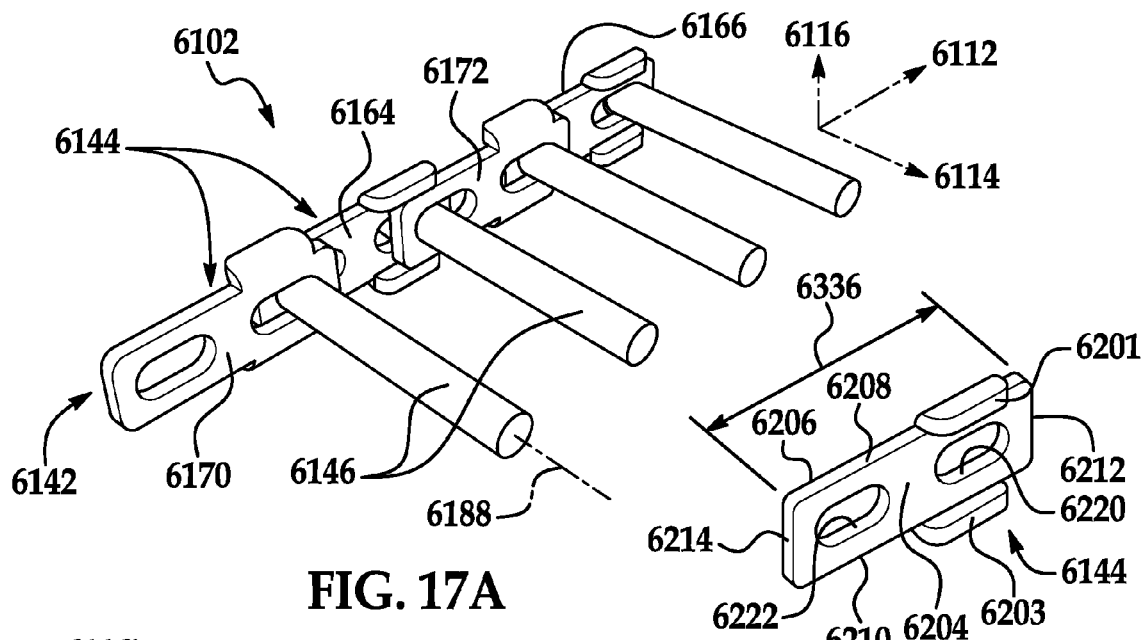
FIG. 17A
FIG. 17B
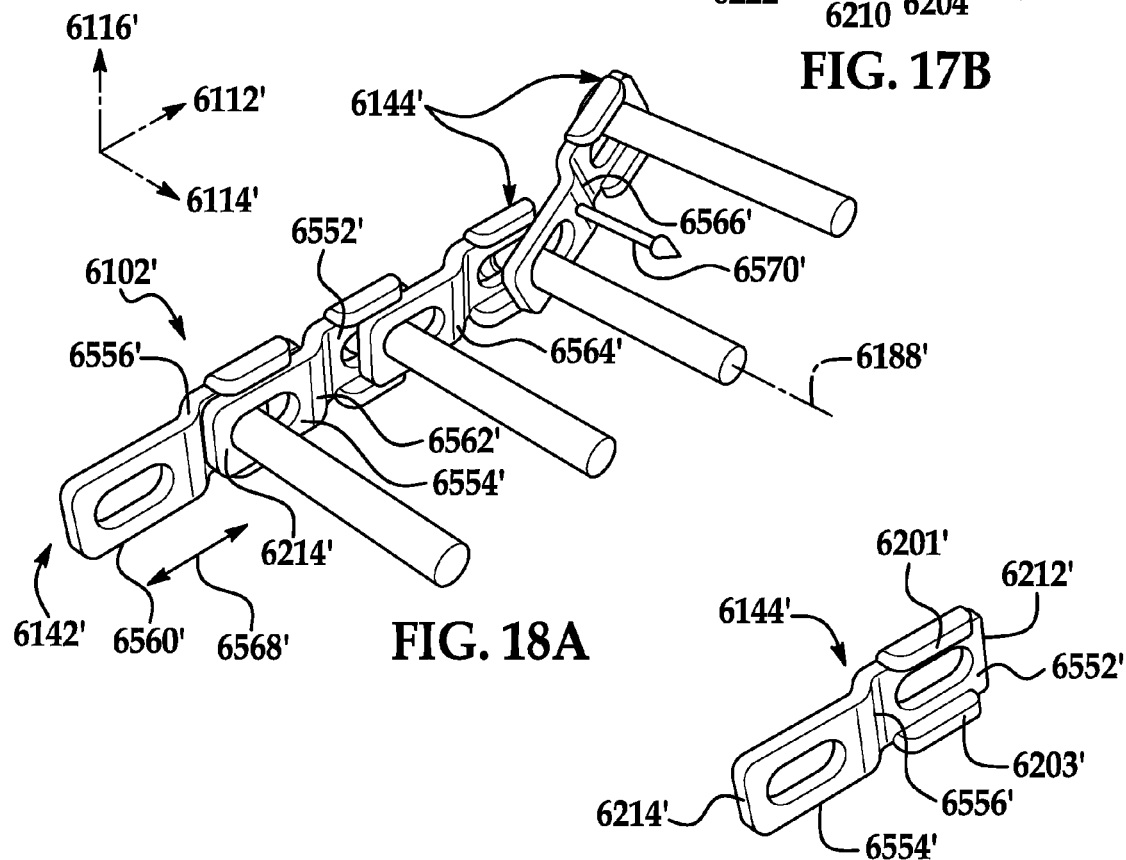
FIG. 18A
FIG. 18B

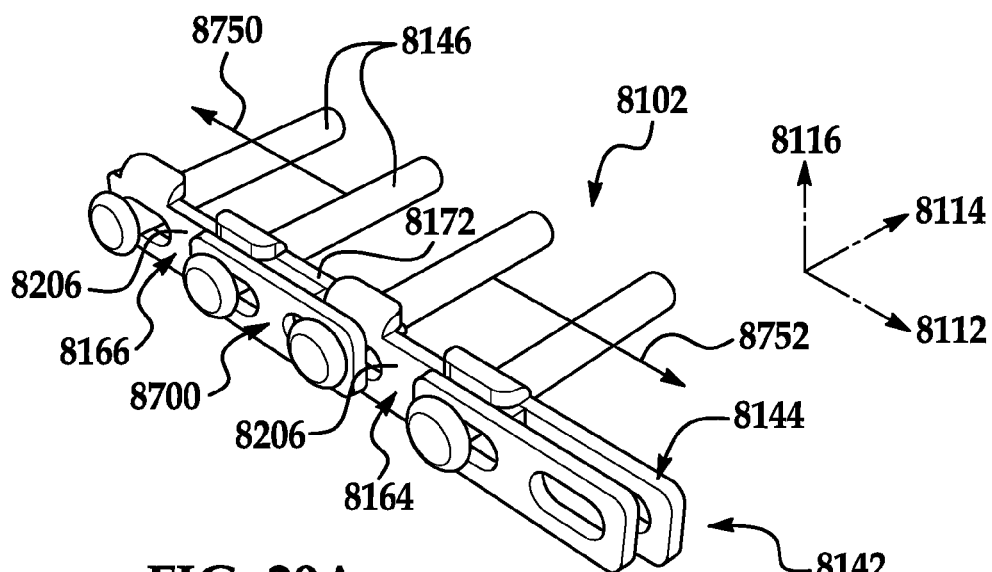
FIG. 20A
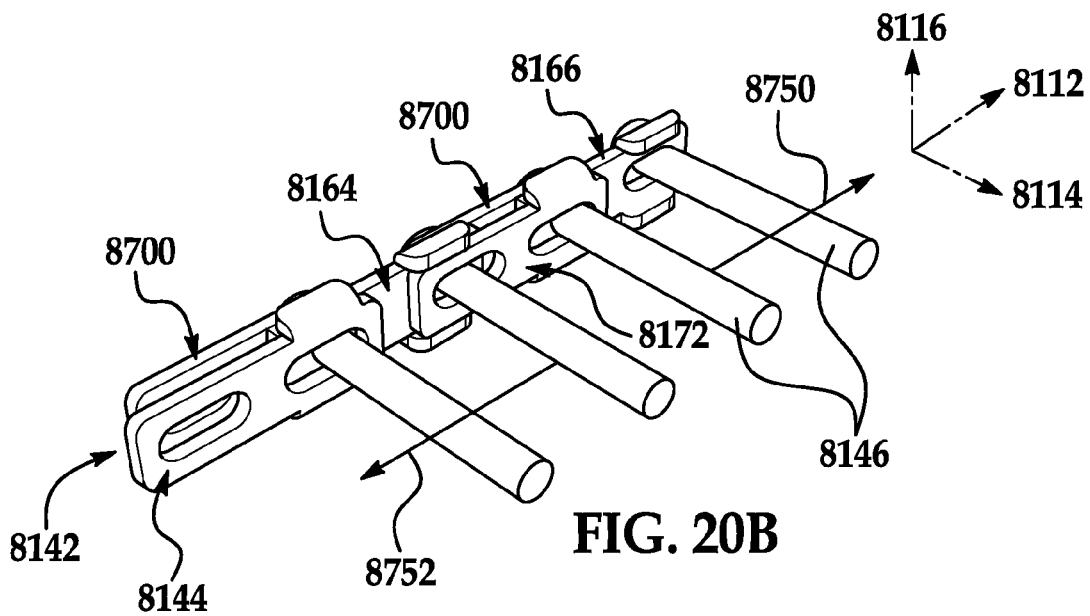
FIG. 20B
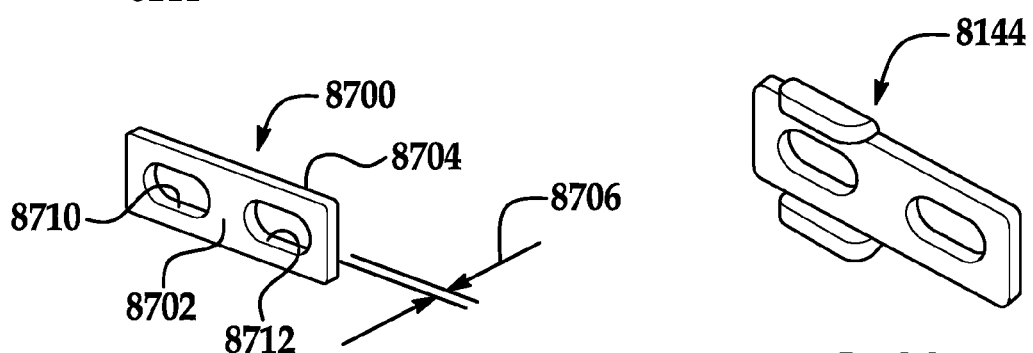
FIG. 20C
FIG. 20D

US 9,663,297 B1

LINKAGE ASSEMBLY FOR SELF-SUPPORTING CONVEYOR BELT

FIELD

The present disclosure relates generally to a conveyor belt, and more specifically to a linkage assembly for a self-supporting conveyor belt.

BACKGROUND

This section provides background information related to the present disclosure and is not necessarily prior art.

Conveyor belts are widely used today in a variety of industrial applications. For example, conveyor belts are used for material handling and processing applications, as well as a variety of food processing systems.

Conveyor belts can include a belt assembly that extends continuously between separate stations and back. In some embodiments, the belt assembly can include rods. The rods can travel along a conveying direction during operation of the belt assembly. As such, the rods can support the foodstuffs, manufactured parts, or other objects that are disposed on the belt assembly, and the rods can convey those objects along the conveying direction.

The belt assembly can also include a linkage assembly with a plurality of links. The links can extend between and interconnect adjacent rods. The links can travel with the rods as the belt assembly travels along the conveying direction.

Moreover, the conveyor belt also typically includes a support structure that supports the belt assembly. The support structure can support the weight of the belt assembly and/or other loads from the belt assembly. As such, the support structure can prevent the belt assembly from collapsing under its own weight and/or under the weight of the objects being conveyed.

SUMMARY

This section provides a general summary of the disclosure, and is not a comprehensive disclosure of its full scope or all of its features.

A conveyor belt is disclosed that includes a self-supporting linkage assembly and a plurality of transverse elements configured to travel along a longitudinal direction. The transverse elements are interconnected by the linkage assembly. The conveyor belt also includes a biasing member. The linkage assembly includes a first link and a second link. The first and second links are configured to move relative to each other between an engaged position and a disengaged position. The biasing member is configured to bias the first and second links toward the engaged position. The first and second links, when in the engaged position, are constrained against rotation relative to each other about at least one axis of rotation. The first and second links, when in the disengaged position, are configured to rotate relative to each other about the axis of rotation.

Furthermore, a conveyor belt is disclosed that defines a longitudinal direction, a transverse direction, and a vertical direction. The conveyor belt includes a self-supporting linkage assembly and a plurality of transverse elements that extend along the transverse direction. The transverse elements are configured to travel along the longitudinal direction. The plurality of transverse elements are interconnected by the linkage assembly. The conveyor belt also includes a biasing member. The linkage assembly includes a first link and a second link. The first link includes a first support surface that faces substantially in the vertical direction. The second link includes a second support surface that faces substantially in the vertical direction and opposite the first support surface. The first and second links are configured to move relative to each other between an engaged position and a disengaged position. In the engaged position, the first support surface abuts the second support surface to constrain the first and second links against rotation relative to each other about an axis of rotation. The axis of rotation extends in the transverse direction. In the disengaged position, the first support surface is spaced apart from the second support surface to allow the first and second links to rotate relative to each other about the axis of rotation. The biasing member is configured to bias the first and second links toward the engaged position.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

FIG. 12A is a perspective view of a linkage assembly according to additional embodiments of the present disclosure;

FIG. 12B is a perspective view of a first link of the linkage assembly of FIG. 12A;

FIG. 12C is a perspective view of a second link of the linkage assembly of FIG. 12A;

FIG. 13 is a perspective view of is a perspective view of a linkage assembly according to additional embodiments of the present disclosure;

FIG. 14A is a perspective view of a linkage assembly according to additional embodiments of the present disclosure;

FIG. 14B is a perspective view of a first link of the linkage assembly of FIG. 14A;

FIG. 14C is a perspective view of a second link of the linkage assembly of FIG. 14A;

FIG. 17A is a perspective view of the linkage assembly according to additional exemplary embodiments of the present disclosure;

FIG. 17B is a perspective view of a link of the linkage assembly of FIG. 17A;

FIG. 18A is a perspective view of the linkage assembly according to additional exemplary embodiments of the present disclosure;

FIG. 18B is a perspective view of a link of the linkage assembly of FIG. 18A.

FIG. 20A is a perspective view of a linkage assembly according to additional embodiments of the present disclosure;

FIG. 20B is a perspective view of the linkage assembly of FIG. 20A taken from the opposite vantage;

FIG. 20C is a perspective view of a link of the linkage assembly of FIGS. 20A and 20B;

FIG. 20D is a perspective view of a link of the linkage assembly of FIGS. 20A and 20B;

Reference numerals in the following discussion indicate corresponding parts throughout the several views of the drawings.

DETAILED DESCRIPTION

Example embodiments will now be described more fully with reference to the accompanying drawings. Embodiments of conveyor belts are discussed that include a belt assembly configured to support and convey an object from one station to another. The belt assembly can include at least one portion that is self-supporting. In some embodiments, the self-supporting belt assembly can support its own weight, the weight of the conveyed object, and/or other applied loads. Accordingly, the belt assembly can remain operable under predetermined loads. In some embodiments, the self-supporting features can allow the belt assembly to remain upright and resist sagging. Furthermore, in some embodiments, the belt assembly can provide a predetermined amount of sagging. Additionally, the conveyor belt can include features that allow the belt assembly to move from an engaged position, in which the belt assembly supports itself, to a disengaged position, in which the belt assembly does not support itself, and back to the engaged position.

Figure 1:
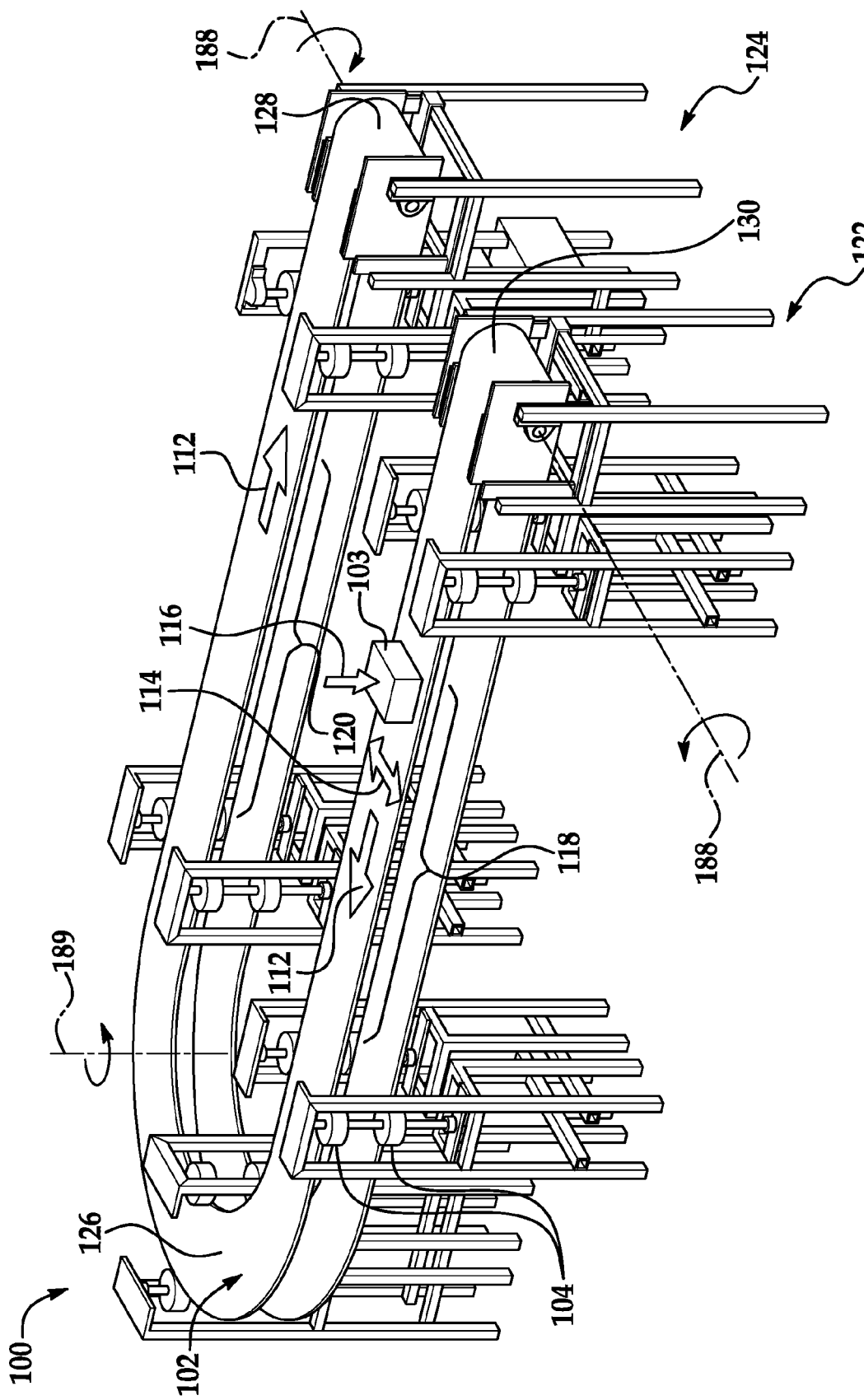
FIG. 1 is a schematic view of a conveyor belt according to exemplary embodiments of the present disclosure.

Referring now to FIG. 1, a conveyor belt 100 is illustrated according to exemplary embodiments. The conveyor belt 100 can generally comprise a belt assembly 102. The belt assembly 102 can support an object 103, such as foodstuffs, manufactured parts, or other objects. The belt assembly 102 can travel along a longitudinal direction indicated by arrow 112. Thus, the belt assembly 102 can convey the object 103 forward along the longitudinal direction 112 (i.e., the conveying direction).

The belt assembly 102 can extend continuously along the longitudinal direction 112. Also, the belt assembly 102 can have a width measured along a transverse direction 114. Furthermore, the belt assembly 102 can define a vertical direction 116, which can be perpendicular to both the longitudinal direction 112 and the transverse direction 114.

The belt assembly 102 can also include a plurality of driving members, two of which are indicated at 104 in FIG. 1. The driving members 104 can be spaced apart along the longitudinal direction 112. The driving members 104 can be of any suitable type, such as rollers, drums, or other actuators that push, pull, or otherwise actuate the belt assembly 102 for movement along the longitudinal direction 112.

In some embodiments, the conveyor belt 100 can include at least one linear segment, in which the belt assembly 102 travels in a substantially straight line along the longitudinal direction 112. Also, the conveyor belt 100 can include at least one curved segment, in which the belt assembly 102 travels along a curved path in the longitudinal direction 112. Specifically, as shown in the embodiment of FIG. 1, the conveyor belt 100 can include a first linear segment 118 and a second linear segment 120. Also, the conveyor belt 100 can include a first curved segment 126, a second curved segment 128, and a third curved segment 130. Additionally, the conveyor belt can define a first station 122 and a second station 124.

During operation, the belt assembly 102 can convey the object 103 from the first station 122 to the second station 124. More specifically, the belt assembly 102 can travel from the first station 122 along the first linear segment 118, through the first curved segment 126, and along the second linear segment 120 to the second station 124. Then, the belt assembly 102 can travel about the second curved segment 128, back along the second linear segment 120, through the first curved segment 126, along the first linear segment 126, and about the third curved segment 130 to continue the continuous movement along the longitudinal direction 112.

It will be appreciated that the first curved segment 126 can curve around a first axis of rotation 189. The first axis of rotation 189 can be oriented vertically (i.e., along the vertical direction 116). In other words, the first axis of rotation 189 can be a vertical axis of rotation 189. Thus, portions of the belt assembly 102 can travel substantially within a horizontal plane through the first curved segment 126.

Also, the second and third curved segments 128, 130 can curve around a second axis of rotation 188. The second axis of rotation 188 can be oriented horizontally and along the transverse direction 114. In other words, the second axis of rotation 188 can be a horizontal axis of rotation 188. Thus, portions of the belt assembly 102 can travel vertically downward through the second curved segment 128 and vertically upward through the third curved segment 130.

Figure 2:
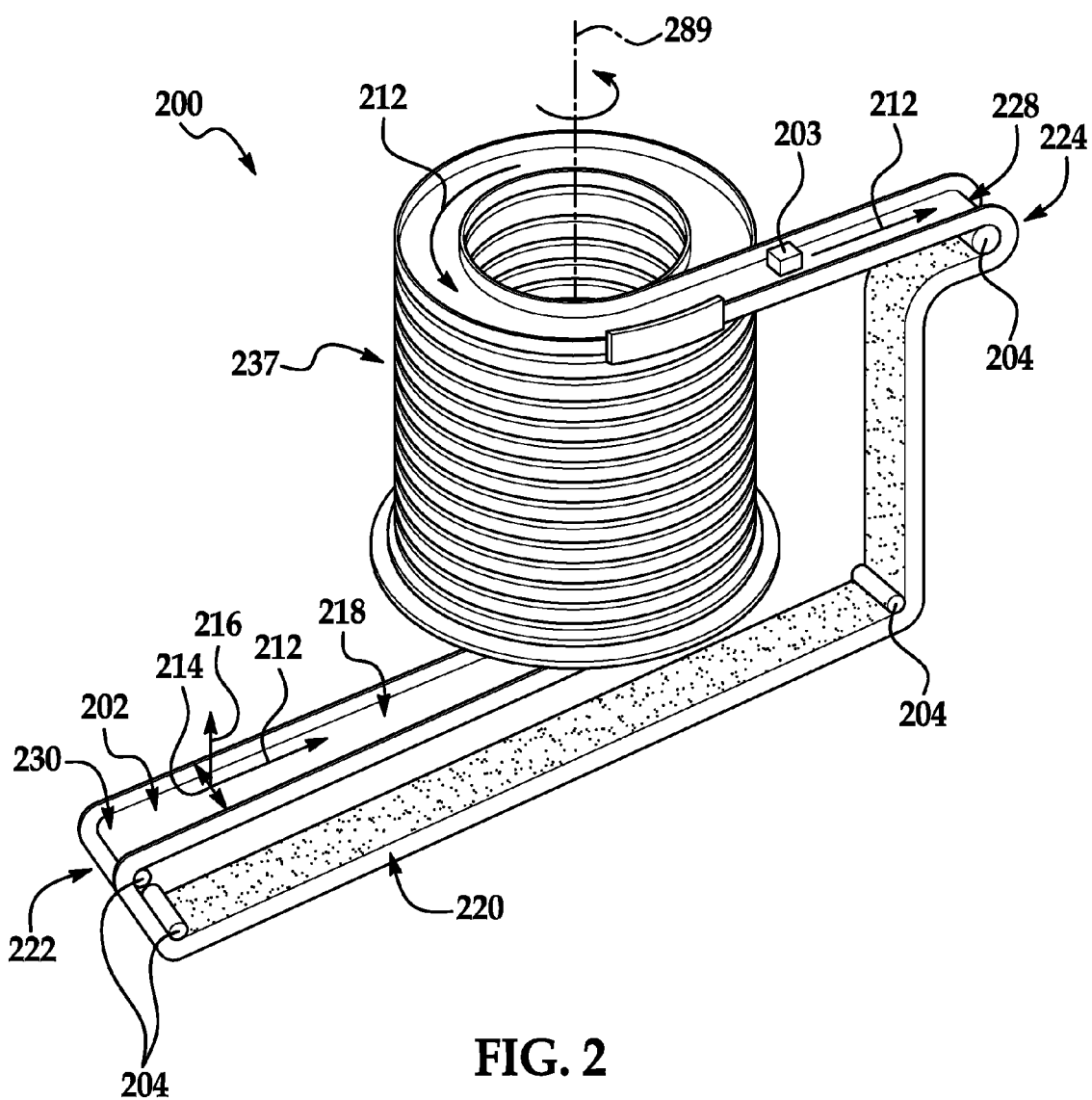
FIG. 2 is a schematic view of the conveyor belt according to additional embodiments of the present disclosure.

Referring now to FIG. 2, additional embodiments of the conveyor belt 200 are illustrated. The conveyor belt 200 can include a belt assembly 202 and a plurality of driving members 204. The driving members 204 can drive the belt assembly 202 for movement forward along the longitudinal direction 212. The transverse direction 214 and the vertical direction 216 are also indicated in FIG. 2.

The conveyor belt 200 can share some similarities to the embodiments of FIG. 1. For example, the conveyor belt 200 can include a first linear segment 218 and a second linear segment 220, which move linearly along the longitudinal direction 212. The conveyor belt 200 also includes a first curved segment 228 and a second curved segment 230. In the embodiment shown, the conveyor belt 200 moves in the vertical direction 216 through the curved segments 228, 230.

The conveyor belt 200 can additionally include a helical section 237. In some embodiments, when the belt assembly 202 travels through the helical section 237, the belt assembly 202 can rotate about an axis 289 and coincidentally advance along the axis 289. In some embodiments, the axis 289 can extend substantially in the vertical direction 216. Accordingly, an object 203 can be conveyed on the belt assembly 202 from a first station 222 to a second station 224 and travel through the helical segment 237 in the process.

It will be appreciated that the conveyor belts 100, 200 of FIGS. 1 and 2 are merely exemplary. Thus, the teachings of the present disclosure can be applied to other conveyor belt configurations.

Figure 3:
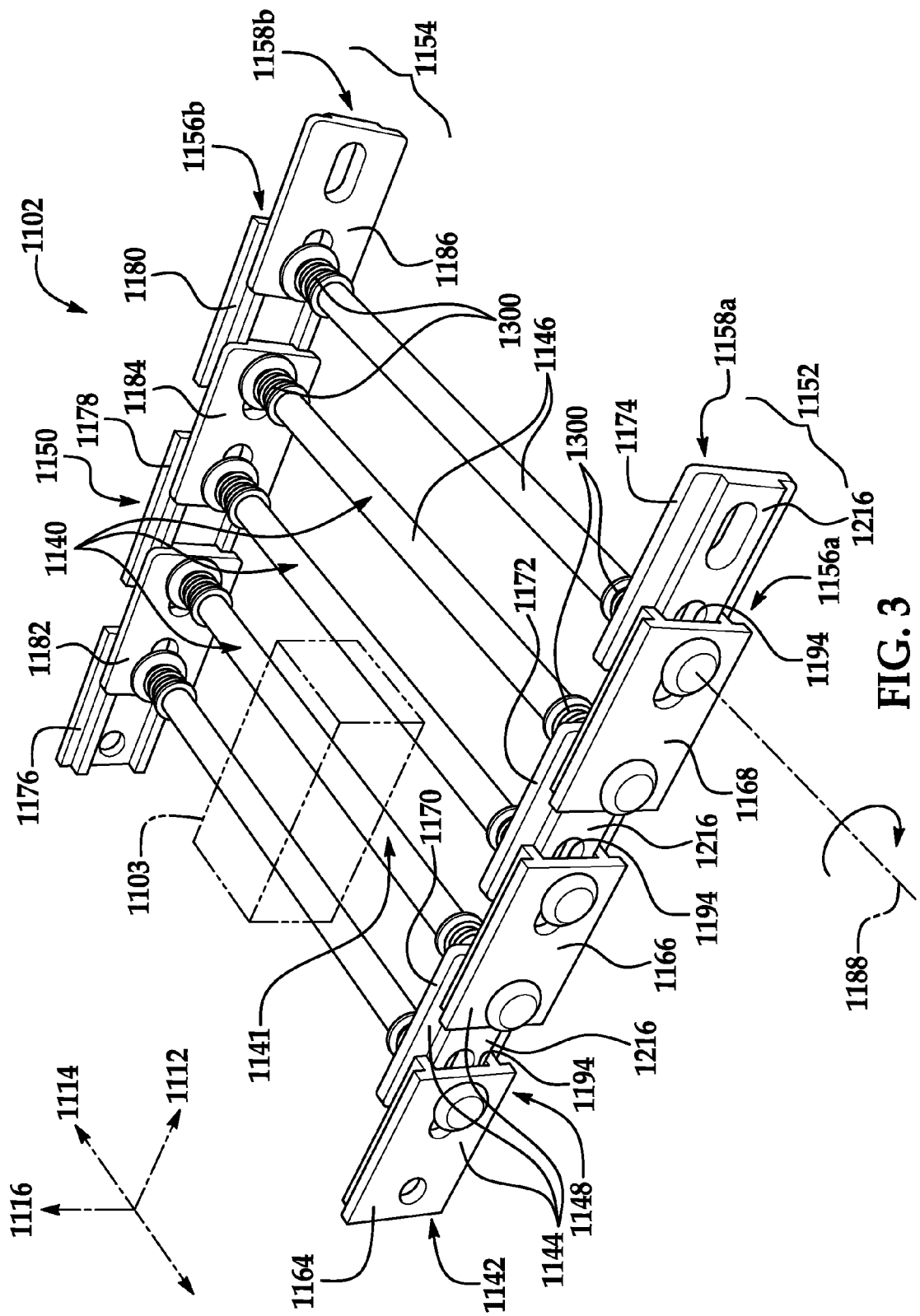
FIG. 3 is a detail view of a portion of the conveyor belt of the present disclosure according to exemplary embodiments.
Figure 4A:
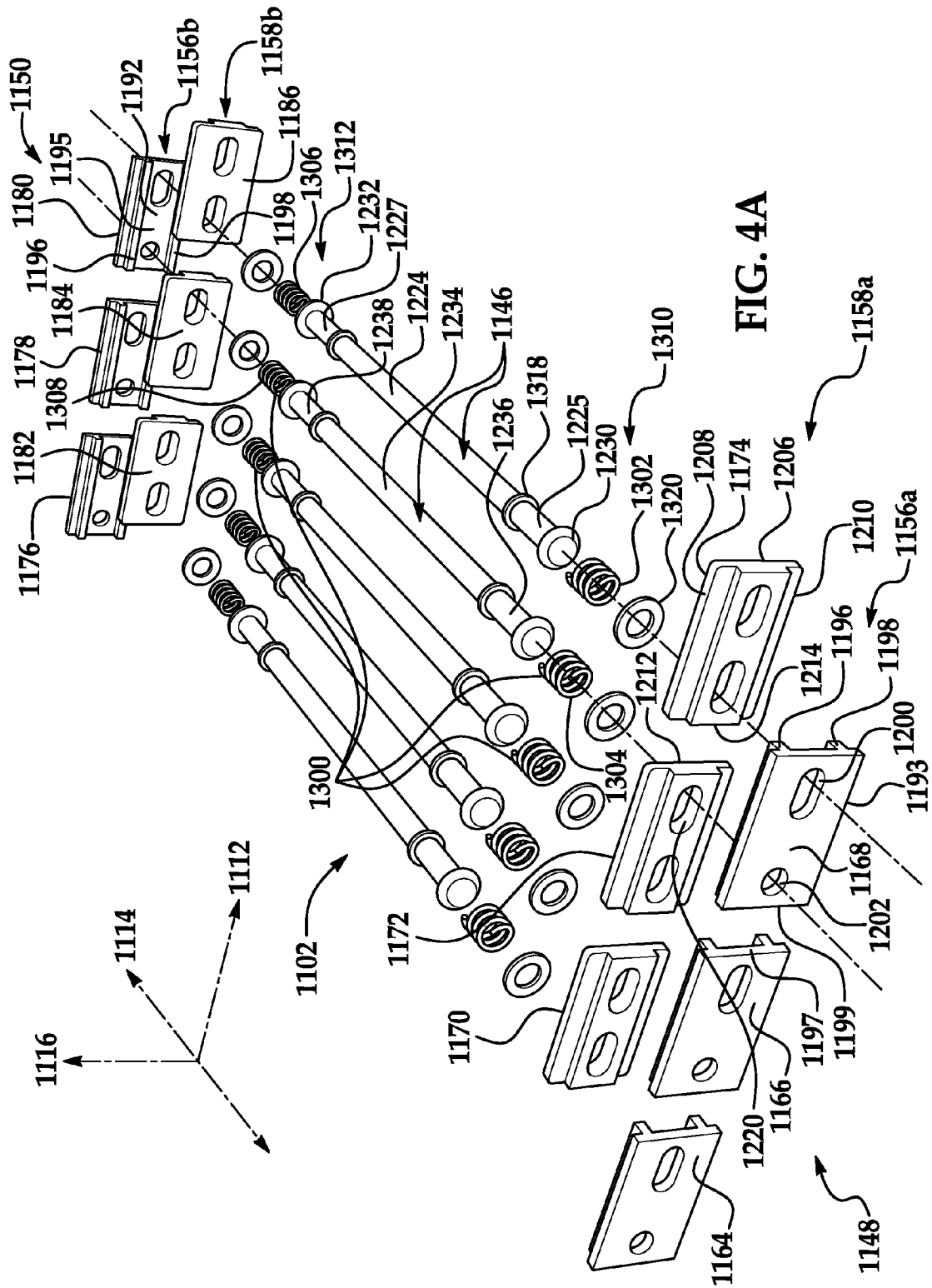
FIG. 4A is an exploded view of the conveyor belt of FIG. 3.
Figure 4B:
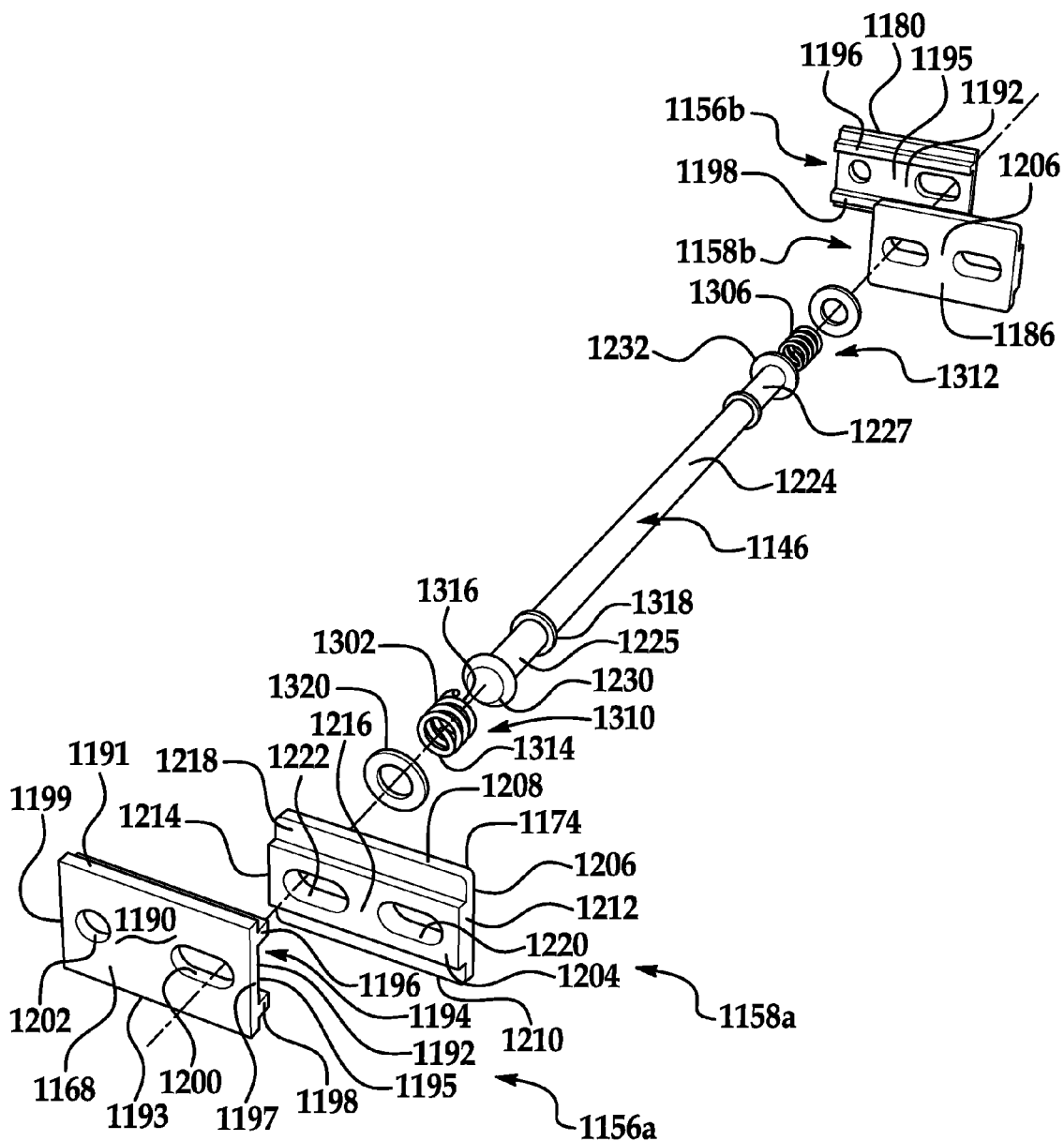
FIG. 4B is an exploded view of a portion of the conveyor belt of FIG. 3.

Referring now to FIGS. 3, 4A, and 4B, portions of a belt assembly 1102 are illustrated in detail according to exemplary embodiments. The belt assembly 1102 can be included in the conveyor belt 100 of FIG. 1 in some embodiments. In other words, the belt assembly 1102 shown in detail in FIGS. 3, 4A, and 4B can correspond to the belt assembly 102 indicated schematically in FIG. 1. In other embodiments, the belt assembly 1102 can be included in the conveyor belt 200 of FIG. 2. It will be appreciated that the belt assembly 1102 can be included in other conveyor belt configurations without departing from the scope of the present disclosure.

The belt assembly 1102 can generally include a plurality of transverse elements 1140. The transverse elements 1140 can extend in the transverse direction 1114 between a first side 1148 and a second side 1150 of the belt assembly 1102. The transverse elements 1140 can collectively provide a support area 1141 for the conveyed object 1103.

As shown in the embodiment of FIGS. 3, 4A, and 4B, the transverse elements 1140 can be elongate rods 1146 that extend in the transverse direction 1114. However, it will be appreciated that the transverse elements 1140 can vary from the illustrated embodiment. For example, in other embodiments, at least one transverse element 1140 can be curved, substantially planar, or can have other shapes. Additionally, the transverse element 1140 can be finger-style, interleaved members in some embodiments.

The belt assembly 1102 can additionally include a linkage assembly 1142. The linkage assembly 1142 can include a plurality of links 1144 that are arranged in series along the longitudinal direction 1112. The links 1144 can interconnect the transverse elements 1140. During operation of the belt assembly 1102, the links 1144 and the transverse element 1140 can travel along the longitudinal direction 1112 to convey the object 1103.

In the embodiment of FIG. 3, a first group 1152 of links 1144 can be disposed proximate the first side 1148 of the belt assembly 1102. A second group 1154 of the links 1144 can be disposed proximate the second side 1150 of the belt assembly 1102 as well.

As shown, the links 1144 of the first group 1152 can include a plurality of outer links 1156a (i.e., first links). The first group 1152 can also include a plurality of inner links 1158a (i.e., second links). The outer links 1156a can be disposed further away from the longitudinal centerline of the belt assembly 1102 than the inner links 1158a. Similarly, the links 1144 of the second group 1154 can include a plurality of outer links 1156b and a plurality of inner links 1158b. In some embodiments, the outer links 1156a of the first group 1152 can be substantially similar to the outer links 1156b of the second group 1154. Likewise, in some embodiments, the inner links 1158a of the first group 1152 can be substantially similar to the inner links 1158b of the second group 1154. It will be appreciated that this is just an example of the linkage assembly 1142, and that it could vary without departing from the scope of the present disclosure.

For purposes of brevity, the links 1144 of the first group 1152 (i.e., the outer links 1156a and the inner links 1158a on the first side 1148) will be discussed in detail below. It will be appreciated that the outer links 1156b and the inner links 1158b of the second group 1154 can be similarly configured.

In some embodiments, at least one outer link 1156a can be a unitary, one-piece member. Similarly, in some embodiments, at least one inner link 1158a can be a unitary, one-piece member. For example, the outer links 1156a and/or the inner links 1158a can be unitary members made out of metal. In other embodiments, the outer links 1156a and/or the inner links 1158a can be unitary members made out of polymeric material.

In other embodiments, at least one outer link 1156a can be non-unitary and can be assembled from two or more parts. Similarly, in some embodiments, at least one inner link 1158a can be non-unitary and can be assembled from two or more parts. For example, in some embodiments, at least one outer link 1156a can include a structural member with one or more attached bearings. Likewise, at least one inner link 1158a can include a structural member with one or more attached bearings.

As will be discussed in detail below, at least one outer link 1156a and at least one inner link 1158a can move relative to each other between an engaged position and a disengaged position. As an example, outer link 1156a and the respective inner link 1158a are shown in an engaged position in FIGS. 3 and 5A according to exemplary embodiments. Outer link 1156a and the respective inner link 1158a are shown in a disengaged position in FIGS. 6A-8 according to exemplary embodiments. In some embodiments, corresponding portions of the outer and inner links 1156a, 1158a can abut when in the engaged position, and those portions can be spaced apart when in the disengaged position. Also, in some embodiments, the inner link 1158a can be at least partially received by the outer link 1156a when in the engaged position, and the inner link 1158a can be disposed outside the outer link 1156a when in the disengaged position. In additional embodiments (not shown), the outer link 1156a can be at least partially received by the inner link 1158a when in the engaged position, and the outer link 1156a can be disposed outside the inner link 1158a when in the disengaged position.

In some embodiments, outer and inner links 1156a, 1158a that are engaged together can be constrained against rotation relative to each other. For example, in the engaged position, the outer and inner links 1156a, 1158a can be constrained against relative rotation about an axis of rotation 1188, which can extend along (e.g., parallel to) the transverse direction 1114. Thus, when the links 1144 of the linkage assembly 1142 are in the engaged position, the belt can support itself and prevent sagging or collapse of the belt assembly 1102. In some embodiments, the links 1144 of the linkage assembly 1142 can be in the engaged position as the belt assembly 1102 travels through a linear segment, such as the first linear segment 118 of FIG. 1, the second linear segment 120 of FIG. 1, or the linear segments 218, 220 of FIG. 2.

In contrast, when in the disengaged position, the outer and inner links 1156a, 1158a can rotate relative to each other about the axis of rotation 1188. This can allow the belt assembly 1102 to travel through a curved segment, such as the second curved segment 128 of FIG. 1, the third curved segment 130 of FIG. 1, or the curved segments 228, 230 of FIG. 2.

The belt assembly 1102 can further include a plurality of biasing members 1300. Generally, the biasing members 1300 can bias respective outer and inner links 1156a, 1158a toward the engaged, self-supporting position. Also, as will be discussed, the links 1156a, 1158a can move away from the engaged position toward the disengaged position against the biasing force supplied by the biasing members 1300.

Accordingly, the belt assembly 1102 can be self-supporting and may not need additional supporting members, jigs, framing members, or the like. Thus, because fewer parts may be needed, the assembly of the conveyor belt can be facilitated. Also, manufacturability of the conveyor belt can be increased because fewer parts will need to be made. Moreover, the conveyor belt can have a smaller foot print than a conventional belt, which may be supported by external support elements disposed along the belt length. Furthermore, the conveyor belt may be more modular than a conventional belt because of the self-supporting features.

Embodiments of the outer links 1156a will now be discussed in detail with reference to FIGS. 4A and 4B. In the embodiments shown, the plural outer links 1156a of the first group 1152 can include a first outer link 1164, a second outer link 1166, and a third outer link 1168. Additionally, the plural outer links 1156b of the second group 1154 can include a fourth outer link 1176, a fifth outer link 1178, and sixth outer link 1180. The features of the outer links 1156a will be discussed primarily in reference to the third outer link 1168, but it will be appreciated that the other outer links 1156a, 1156b can include similar features.

As shown in FIG. 4B, the outer links 1156a, 1156b can include an outer face 1190 and an opposite inner face 1192. The outer links 1156a, 1156b can further include a top edge 1191 and an opposite bottom edge 1193. Moreover, the outer links 1156a, 1156b can include a forward edge 1197 and a rear edge 1199.

In some embodiments, the outer face 1190 can be substantially planar. Also, the inner face 1192 can be non-planar. For purposes of clarity, the features of the inner face 1192 are indicated on both the third outer link 1168 as well as the sixth outer link 1180.

In some embodiments, the inner face 1192 can define an opening 1194. More specifically, in some embodiments, the inner face 1192 can include a base 1195 as well as a first rail 1196 and a second rail 1198 that both project inward from the base 1195. The first rail 1196 and the second rail 1198 can extend in the longitudinal direction 1112 and terminate proximate the forward edge 1197 and the rear edge 1199 in some embodiments. The first rail 1196, the second rail 1198, and areas of the base 1195 between the rails 1196, 1198 can cooperate to define the opening 1194. For example, the first rail 1196, the second rail 1198, and the base 1195 can cooperatively define an elongate groove or channel that extends in the longitudinal direction 1112.

Additionally, in some embodiments, the outer links 1156a, 1156b can include at least one aperture, such as a forward aperture 1200 and a rear aperture 1202. The forward aperture 1200 and the rear aperture 1202 can extend entirely through the outer link 1156a, 1156b such that the apertures 1200, 1202 are open at the outer face 1190 and the inner face 1192. In some embodiments, at least one of the apertures 1200, 1202 can be a through-hole with a substantially circular periphery. Also, in some embodiments, at least one of the apertures 1200, 1202 can be an elongate through-hole, such as a slot. Specifically, as shown in the illustrated embodiment of FIG. 4B, the rear aperture 1202 can be a circular through-hole, and the forward aperture 1200 can be a slot that is elongated in the longitudinal direction 1112.

Embodiments of the inner links 1158a, 1158b will now be discussed in detail with reference to FIGS. 4A and 4B. As shown, the plural inner links 1158a of the first group 1152 can include a first inner link 1170, a second inner link 1172, and a third inner link 1174. Also, the plural inner links 1158b of the second group 1154 can include a fourth inner link 1182, a fifth inner link 1184, and a sixth inner link 1186. The features of the inner links 1158a, 1158b will be discussed primarily in relation to the third inner link 1174, but it will be appreciated that the other inner links 1158a, 1158b can include similar features.

As shown in FIG. 4B, the inner links 1158a, 1158b can include an outer face 1204 and an opposite inner face 1206. The inner links 1158a, 1158b can further include a top edge 1208 and an opposite bottom edge 1210. Moreover, the inner links 1158a, 1158b can include a forward edge 1212 and a rear edge 1214.

In some embodiments, the inner face 1206 can be substantially planar. For example, the majority of the inner face 1206 can lie within a common, two-dimensional plane. Also, the outer face 1204 can be non-planar. For example, portions of the outer face 1206 can protrude from other portions in some embodiments such that the outer face 1206 extends in three dimensions. In some embodiments, a plurality of substantially flat surfaces can cooperate to define the outer face 1206, and the flat surfaces can be disposed at various angles relative to each other. In additional embodiments, one or more portions of the outer face 1206 can be three-dimensionally curved.

More specifically, in some embodiments, the outer face 1204 can include a base 1218 and a protrusion 1216 that projects outward from the base 1218. In some embodiments, the protrusion 1216 can have a substantially inverse shape to the opening 1194 of the outer links 1156a, 1156b. For example, as shown in FIG. 4B, the protrusion 1216 can be substantially rectangular and elongate such that the protrusion 1216 can be received within the rectangular, elongate opening 1194 of the adjacent outer link 1156a.

Additionally, in some embodiments, the inner links 1158a, 1158b can include at least one aperture, such as a forward aperture 1220 and a rear aperture 1222. The forward aperture 1220 and the rear aperture 1222 can extend through the inner link 1158a, 1158b such that the apertures 1220, 1222 are open at the outer face 1204 and the inner face 1206. In some embodiments, one or both of the apertures 1220, 1222 can be an elongate through-hole, such as a slot.

Referring now to FIGS. 3, 4A, and 4B, the interconnection between the rods 1146 and the inner and outer links 1156a, 1158a, 1156b, 1158b will now be discussed. This interconnection will be discussed primarily in relation to a first rod 1224 and a second rod 1234, which are adjacent each other and arranged in sequence in the longitudinal direction 1112. It will be appreciated that the other rods 1146 can be interconnected similarly.

As shown in FIG. 4A, the first rod 1224 can include a first end 1225 that can be received in both the rear aperture 1222 of the third inner link 1174 and the forward aperture 1200 of the third outer link 1168 to interconnect the first rod 1224 to the inner and outer links 1174, 1168. Also, in some embodiments, the first end 1225 of the rod 1224 can include an enlarged or bulbous head 1230 (i.e., a so-called "buttonhead"), and the head 1230 can be larger than the aperture 1200 to retain the inner and outer links 1174, 1168 on the rod 1224. Also, the first rod 1224 can include a second end 1227 with a head 1232. The second end 1227 can be received by and interlocked with the sixth inner link 1186 and the sixth outer link 1180, similar to the first end 1225 of the rod 1224.

Similarly, a first end 1236 of the second rod 1234 can be received in both the forward aperture 1220 of the second inner link 1172 and the rear aperture 1202 of the third outer link 1168. A second end 1238 can be received by and interlocked with the fifth inner link 1184 and the sixth outer link 1180, similar to the first end 1236 of the rod 1234.

In some embodiments, at least one of the inner links 1158a, 1158b can be supported for movement relative to the rods 1146 in one or more planes or directions. Likewise, at least one of the outer links 1156a, 1156b can be supported for movement relative to the rods 1146 in one or more planes or directions.

For example, the slot-like apertures 1220, 1222 can allow the inner link 1158a to move (e.g., slide) in the longitudinal direction 1112 relative to the rods 1146. Also, in some embodiments, the inner links 1158a can rotate relative to the rods 1146 about the axis of rotation 1188. Additionally, in some embodiments, the inner link 1158a can move inwardly in the transverse direction 1114 and away from the outer end of the respective rod 1146.

Figure 5A:
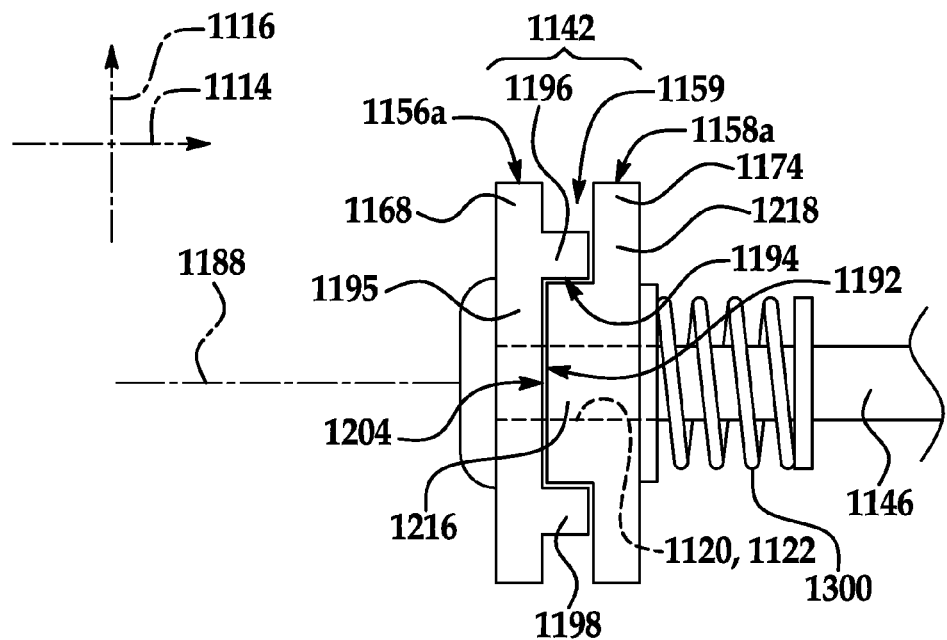
FIG. 5A is an end view of the conveyor belt of FIG. 3, wherein links of the conveyor belt are shown in an engaged position according to exemplary embodiments.
Figure 5B:
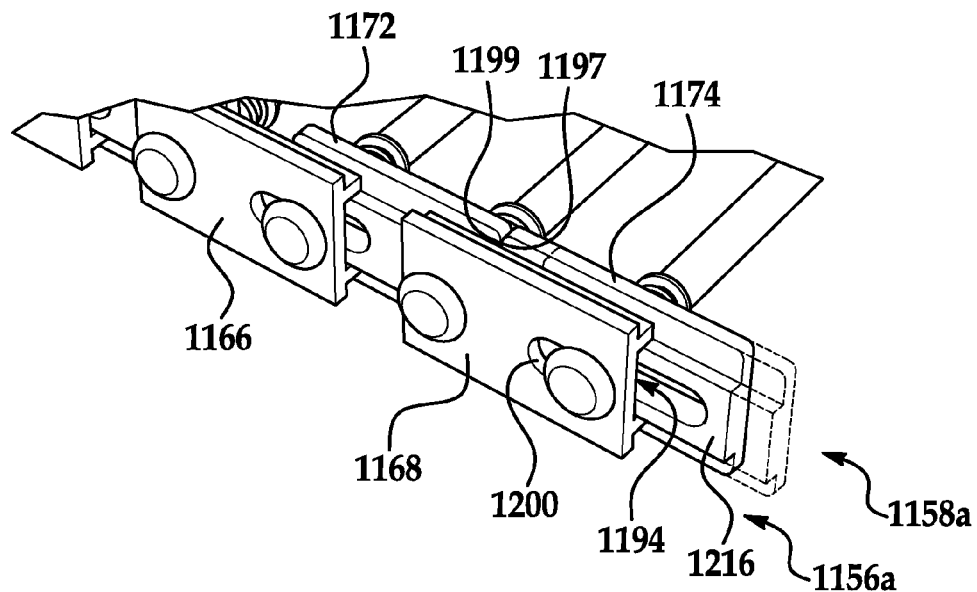
FIG. 5B is a perspective view of a portion of the conveyor belt of FIG. 3, wherein a link is shown in a retracted position in solid lines and is also shown in an extended position in phantom.

Additionally, as represented in the illustrated embodiment of FIG. 5B, the rod 1146 received in the forward aperture 1200 of the inner link 1158a can move in the longitudinal direction 1112 relative to the respective outer link 1156a. Also, in some embodiments, the outer link 1156a can move in the transverse direction 1114 relative to the rods 1146. In other embodiments, the outer link 1156a can be fixed to at least one of the respective rods 1146. For example, in these embodiments, the outer face 1204 can be welded to the rod 1146 extending through the rear aperture 1202.

Furthermore, the outer and inner links 1156a, 1158a can move relative to each other in one or more planes or directions. As will be discussed, the outer and inner links 1156a, 1158a can move relative to each other between the engaged, self-supporting position and the disengaged position.

Exemplary embodiments of the biasing member 1300 will now be discussed in detail with respect to FIG. 4B. The belt assembly 1102 can include any suitable type of biasing member 1300. For example, in some embodiments, one or more of the biasing members 1300 can include one or more helical compression springs, as shown. The helical compression springs can be commercially available and inexpensive. Also, the compression springs can facilitate assembly of the belt assembly 1102 and can provide a precise biasing force for the belt assembly 1102. In additional embodiments, the biasing members 1300 can include one or more leaf springs. The leaf spring(s) can be useful for a relatively long time before repair or replacement is necessary, and the leaf spring(s) can facilitate cleaning of the belt assembly 1102. Moreover, the biasing members 1300 can include one or more Belleville washers in some embodiments. The Belleville washers can facilitate assembly.

Furthermore, the belt assembly 1102 can include any number of biasing members 1300. For example, the plurality of biasing members 1300 can include a first biasing member 1302, a second biasing member 1304, a third biasing member 1306, and a fourth biasing member 1308. Also, the biasing members 1300 can be disposed in any suitable area of the belt assembly 1102. For example, in the illustrated embodiment, the biasing members 1300 can be arranged in a first group 1310, proximate the first side 1148 and a second group 1312, proximate the second side 1150.

The first biasing member 1302 in FIG. 4B will be referred to as a representative example of one or more of the biasing members 1300. As shown, the biasing member 1302 can include a first end 1314 and a second end 1316. Also, the biasing member 1302 can wind helically about the end 1225 of the rod 1224.

In some embodiments, the belt assembly 1102 can include a plurality of retainers that retain the biasing members 1300 in a predetermined position. For example, the rod 1224 can include a first retainer 1320 and a second retainer 1318. The first and/or second retainer 1318, 1320 can be a washer or washer-like member in some embodiments. Also, in some embodiments, the first and/or second retainer 1318, 1320 can be welding material or other similar material that is applied onto the rod 1224. The first and/or second retainers 1318, 1320 can be affixed, clipped, welded, or otherwise secured to the rod 1224 in one position, either permanently or removably. Moreover, in some embodiments, the first and/or second retainers 1318, 1320 can be made by deforming the material of the rod 1224. The first end 1314 of the biasing member 1302 can abut the first retainer 1318. Also, the second retainer 1320 can abut against the inner face 1206 of the respective inner link 1174. Accordingly, the biasing member 1302 can abut against the second retainer 1320, which in turn, abuts against the inner face 1206 of the inner link 1174. When compressed, the biasing member 1302 can bias and push the inner link 1174 outward in the transverse direction 1114, toward the outer link 1168. Accordingly, the biasing member 1302 can bias the inner link 1174 to engage with the outer link 1168 (i.e., toward the engaged position) as will be discussed in detail below.

It will be appreciated that the biasing members 1300 of the belt assembly 1102 can be configured differently from the illustrated embodiments. For example, in some embodiments, one or more of the biasing members 1300 can bias and push the outer link 1168 in an inward, transverse direction toward engagement with the inner link 1174 (i.e., toward the engaged position). In additional embodiments, the plurality of biasing members 1300 can be configured to both bias the outer link 1168 in an inward, transverse direction and bias the inner link 1174 in an outward, transverse direction such that the outer and inner links 1168, 1174 are biased toward each other and toward the engaged position. Also, one or more of the biasing members 1300 can be fixed to a respective link, for example, via staking, welding, or riveting. Moreover, in some embodiments, one or more of the biasing members 1300 can be integrally attached to a respective link 1144 to form a one-piece, unitary member. For example, the link 1144 can include a portion that is resilient, and the resilient portion can define the biasing member 1300.

Engagement of the outer links 1156a and the inner links 1158a will now be discussed in greater detail. As will be discussed, the outer link 1156a can abut, mesh with, or otherwise engage with respective ones of the inner links 1158a when the belt assembly 1102 is in the engaged position. Also, in some embodiments, portions of the inner link 1158a can be received within the outer link 1156a and/or portions of the outer link 1156a can be received within the inner link 1158a.

Furthermore, in some embodiments, when in the engaged position, the belt assembly 1102 can resist and support loads directed in the vertical direction 1116, such as weight loads that are directed downward in the vertical direction 1116. Also, in some embodiments, when in the engaged position, the belt assembly 1102 can resist and support loads directed in the transverse direction 1114 and/or in the longitudinal direction 1116.

Representative outer and inner links 1156a, 1158a are shown in the engaged position in FIGS. 3 and 5A according to exemplary embodiments. As shown, the protrusion 1216 of the inner link 1158a can be received within the opening 1194 of the outer link 1156a. In some embodiments, one or more areas of the outer face 1204 of the inner link 1158a can abut with opposing areas of the inner face 1192 of the outer link 1156a. Specifically, in some embodiments, the upper surface of the protrusion 1216 can abut against the opposing lower surface of the rail 1196, and the lower surface of the protrusion 1216 can abut against the opposing upper surface of the rail 1198. As shown, these opposing and abutting surfaces of the protrusion 1216 and rails 1196, 1198 can face substantially in the vertical direction 1116 to support loads directed substantially in the vertical direction 1116. For example, the abutting surfaces can be substantially planar and can face substantially normal to the vertical direction 1116 in some embodiments. In other embodiments, these abutting surfaces can be oriented at a different angle relative to the vertical direction 1116. The abutting surfaces can also be contoured in some embodiments. The abutment of these surfaces can allow the linkage assembly 1142 to support itself by resisting forces directed substantially in the vertical direction 1116. For example, a force applied to the inner link 1158a downward in the vertical direction 1116 can transfer to the second rail 1198 of the outer link 1156a. Likewise, a force applied to the inner link 1158a upward in the vertical direction 1116 can transfer to the first rail 1196 of the outer link 1156a. Forces can distribute through the linkage assembly 1142 to limit rotation of the inner links 1158a relative to the outer links 1156a.

Moreover, as shown in the embodiment of FIG. 5A, the outer surface of the protrusion 1216 can abut against the opposing inner surface of the base 1195. Furthermore, in some embodiments, the inner surfaces of the first and second rails 1196, 1198 can abut against the opposing outer surface of the base 1218. In some embodiments, these opposing and abutting surfaces can be planar. These surfaces can also face substantially in the transverse direction 1114 (e.g., substantially normal to the transverse direction 1114).

Also, in some embodiments, when the outer and inner links 1156a, 1158a are engaged, there can be a gap 1159 formed together by the outer and inner links 1156a, 1158a. Specifically, as shown in FIG. 5A, the gap 1159 can be an elongate channel collectively defined by the base 1195 of the outer link 1156a, the first rail 1196, and the base 1218 of the inner link 1158a.

A plurality of links 1144 arranged in series along the longitudinal direction 1112 can be engaged together. For example, as shown in FIG. 3, the protrusion 1216 of the first inner link 1170 can be received within the opening 1194 of the first link 1164 and the opening 1194 of the second outer link 1166. Also, the protrusion 1216 of the second inner link 1172 can be received within the openings 1194 of the second and third outer links 1166, 1168, and so on within the first group 1152 of links 1144. The links 1144 within the second group 1154 (i.e., on the second side 1150 of the belt assembly 1102) can be similarly engaged together. In this position, relatively long extensions of the belt assembly 1102 can support themselves.

When in this engaged position, the outer and inner links 1156a, 1158a can be constrained against relative rotation about the axis of rotation 1188. As such, the belt assembly 1102 can resist forces directed in the vertical direction 1116 that would otherwise cause the belt assembly 1102 to bend about the axis of rotation 1188. As illustrated, when the outer and inner links 1156a, 1158a are in the engaged position, the outer and inner links 1156a, 1158a can be constrained against relative rotation about the axis of rotation 1188 in both the clockwise direction and the counter-clockwise direction. In other embodiments, when engaged, the outer and inner links 1156a, 1158a can be constrained in just one rotational direction (i.e., in either the clockwise direction or the counter-clockwise direction).

The belt assembly 1102 of FIG. 3 can correspond to the belt assembly 102 of FIG. 1, in some embodiments. As such, links 1146 of the belt assembly 102 can move to the engaged, self-supporting position when advancing through the first linear segment 118 can support itself as described above. Thus, this segment 118 of the belt assembly 1102 is unlikely to sag or collapse due to the weight of the belt assembly 102, weight from the objects 103 on top of the belt assembly 1102, etc. Also, links 1146 can move to the engaged, self-supporting position when advancing through the second linear segment 120.

In some embodiments, even when the linkage assembly 1142 is in the engaged position, the engaged links 1144 can move relative to each other. For example, in some embodiments represented in FIG. 5B, the engaged links 1144 can move in the longitudinal direction 1112 relative to each other. In additional embodiments represented in FIGS. 5C and 5D, the engaged links 1144 can rotate relative to each other about one axis of rotation while being constrained against rotation about another axis of rotation. In both cases, the links 1144 can be referred to as being "moveably engaged" (i.e., engaged but allowed at least one degree of freedom relative to each other).

For example, as shown in the embodiment of FIG. 5B, the inner link 1174 can move in the longitudinal direction 1112 relative to the outer link 1168. The protrusion 1216 of the inner link 1158a can slide in the longitudinal direction 1112 within the opening 1194 of the outer link 1168 due to the elongated slot-like apertures 1200, 1220, 1222 within the inner and outer links 1174, 1168. (The inner link 1174 is shown in a retracted position in FIG. 5B, and an extended position of the inner link 1174 is shown in phantom.) Thus, the inner and outer links 1174, 1168 can slide in the longitudinal direction 1112 relative to each other to allow the belt to stretch to accommodate curves or variations in tension. Other links 1144 can be similarly configured.

Also, in some embodiments, neighboring links 1144 extending in series along the longitudinal direction 1112 can abut each other to limit movement of the links 1144 in the longitudinal direction 1112. Neighboring inner links 1158a can abut to limit this movement. By way of example, the forward edge 1197 of the inner link 1172 can abut or otherwise engage the rear edge 1199 of the inner link 1174 as shown in the embodiment of FIG. 5B. Accordingly, the forward edge 1197 and the rear edge 1199 can abut such that forces directed substantially along the longitudinal direction 1112 can transfer from link to adjacent link. Similarly, in some embodiments, neighboring outer links 1156a can abut to limit relative movement of the outer links 1156a in the longitudinal direction 1112. Accordingly, the linkage assembly 1142 can support and resist forces directed in the longitudinal direction 1112.

Figure 5C:
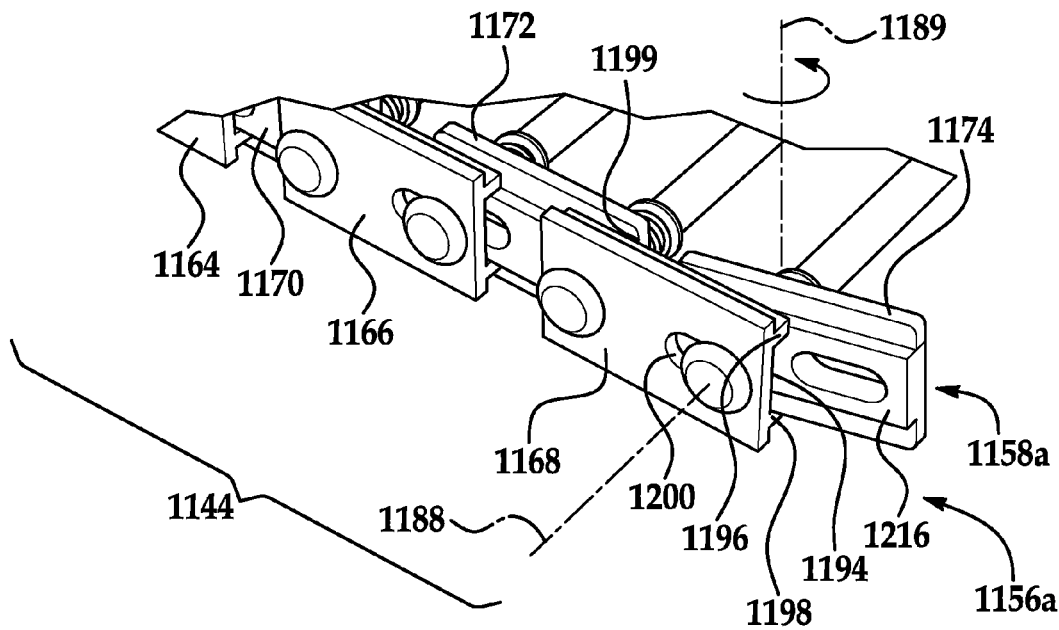
FIG. 5C is a perspective view of a portion of the conveyor belt of FIG. 3, wherein a link is shown rotated relative to another link.
Figure 5D:
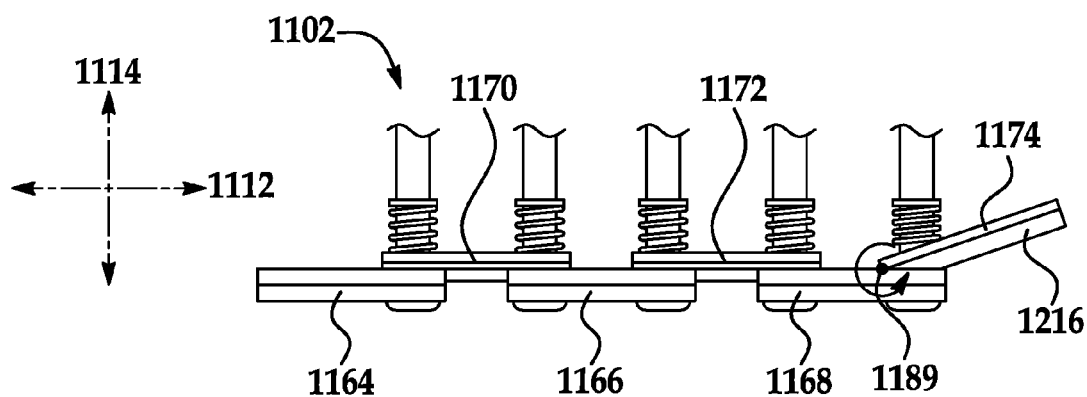
FIG. 5D is a top view of the conveyor belt of FIG. 5C.

Furthermore, as shown in the embodiments of FIGS. 5C and 5D, the inner link 1174 can be engaged with the outer link 1168, and yet the inner link 1174 can rotate about a vertical axis of rotation 1189. More specifically, the inner link 1174 can be rotated such that a portion of the protrusion 1216 of the inner link 1174 remains within the opening 1194 and other portions of the protrusion 1216 are outside the opening 1194. Accordingly, in some embodiments, the link 1174 can rotate about a vertical axis of rotation 1189 relative to the link 1168, and at the same time, the protrusion 1216 can remain in abutting contact with the rails 1196, 1198 to inhibit relative rotation of the links 1168, 1174 about the transverse axis of rotation 1188. Other links 1144 within the belt assembly 1102 can be similarly configured. Thus, the belt assembly 1102 of FIGS. 5C and 5D can curve through the horizontal second curved segment 128 of FIG. 1. Stated differently, the second curved segment 128 can be self-supporting in some embodiments. Likewise, in some embodiments, the belt assembly 1102 of FIGS. 5C and 5D can curve through the helical section 237 of FIG. 2, supporting itself as it helically travels along the axis 239.

Disengagement of the linkage assembly 1142 will now be discussed according to exemplary embodiments. As illustrated, the outer and inner links 1156a, 1158a can move away from the engaged position of FIG. 5A to the disengaged position of FIGS. 6A, 6B, and 7.

Figure 6A:
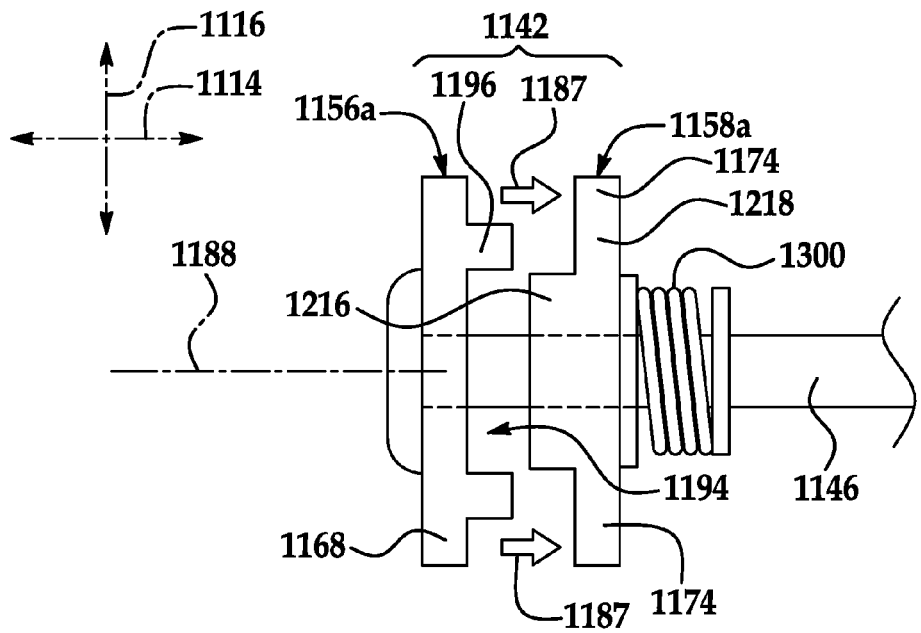
FIG. 6A is an end view of the conveyor belt of FIG. 3, wherein links of the conveyor belt are shown in a disengaged position according to exemplary embodiments.
Figure 6B:
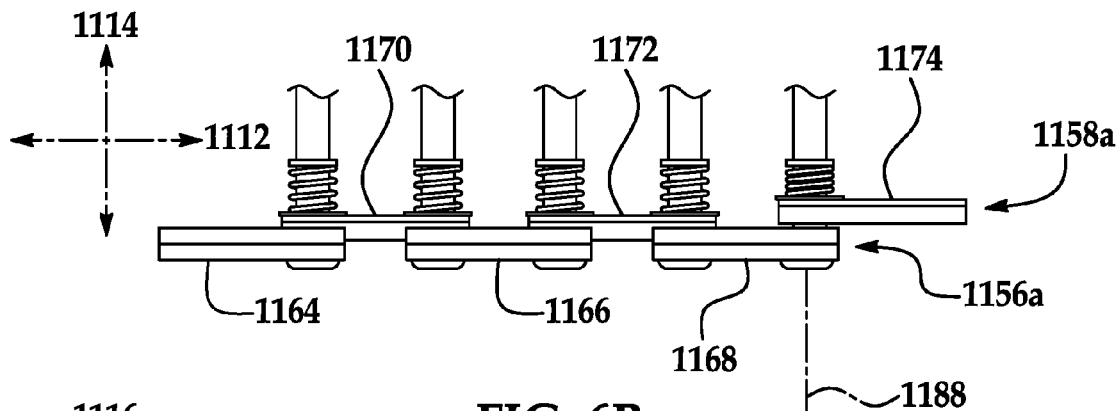
FIG. 6B is a top view of the conveyor belt of FIG. 3, wherein some links are shown in the engaged position and others are shown in the disengaged position.

As shown in FIG. 6A, for example, the inner link 1174 can move inward in the transverse direction 1114, away from the outer link 1168 as indicated by arrows 1187. The apertures 1120, 1122 can allow the inner link 1174 to slide inward in the transverse direction 1114. As shown, the biasing member 1300 can compress and resist this movement of the inner link 1174. In other words, the biasing member 1300 can bias against this inward movement of the inner link 1174.

Figure 7:
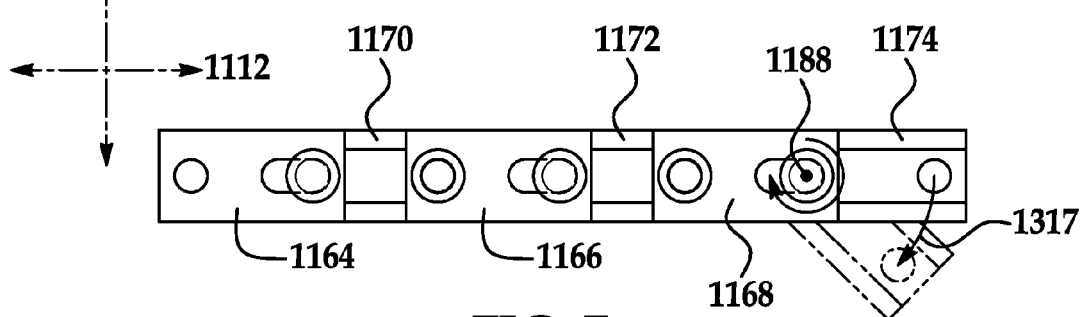
FIG. 7 is a side view of the conveyor belt of FIG. 6.

In the disengaged position, the protrusion 1216 of the inner link 1174 can be disposed outside the opening 1194 of the outer link 1168. Thus, in the disengaged position, the protrusion 1216 can disengage from the rails 1196, 1198, and the inner link 1174 can be free to rotate about the horizontal axis of rotation 1188. To illustrate this rotation, FIG. 7 shows the inner link 1174 in a first, horizontal position and in a second, rotated position in phantom. The rotation about the horizontal axis of rotation 1188 is indicated by arrow 1317.

Figure 8:
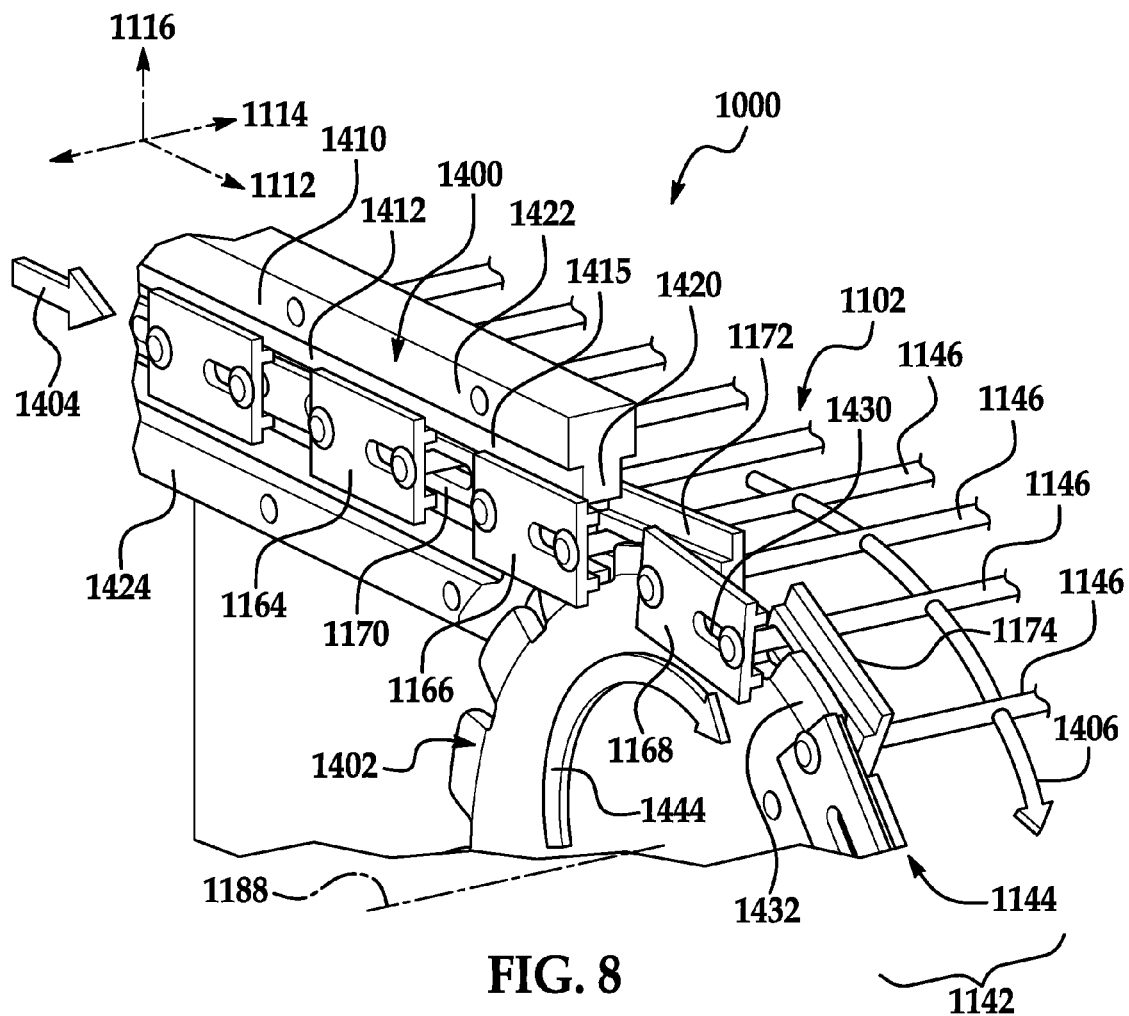
FIG. 8 is a perspective view of the conveyor belt of FIGS. 6 and 7, wherein a disengagement device is also shown.

As shown in FIG. 8, a plurality of links 1144 arranged in series along the longitudinal direction 1112 can be disengaged. Accordingly, as shown in FIG. 8, the linkage assembly 1142 can disengage to allow the belt assembly 1102 to travel along a curved path about the axis of rotation 1188. Using the conveyor belt 100 of FIG. 1 as an example, the disengagement of the belt assembly 1102 shown in FIG. 8 can represent motion of the belt assembly 102 about the second curved segment 128. In the case of the conveyor belt 200 of FIG. 2, this can represent motion of the belt assembly 202 about the curved segment 228. However, it will be appreciated that the linkage assembly 1142 can be included in other conveyor belt configurations without departing from the scope of the present disclosure.

As shown in FIG. 8, the conveyor belt can additionally include at least one disengagement device that selectively disengages the links 1144. As shown in the embodiment of FIG. 8, the conveyor belt 1000 can include a first disengagement device 1400 and a second disengagement device 1402. The first disengagement device 1400 is shown independently in FIG. 9, and the second disengagement device 1402 is shown independently in FIGS. 10A and 10B. It will be understood that the disengagement device of the conveyor belt 1000 can vary from these embodiments without departing from the scope of the present disclosure.

As shown in FIG. 8, the belt assembly 1102 can travel in the longitudinal direction 1112 as indicated by arrow 1404 and then curve downward and around the axis 1188 as indicated by arrow 1406. The first and second disengagement devices 1400, 1402 can disengage the links 1144 for this operation.

Figure 9:
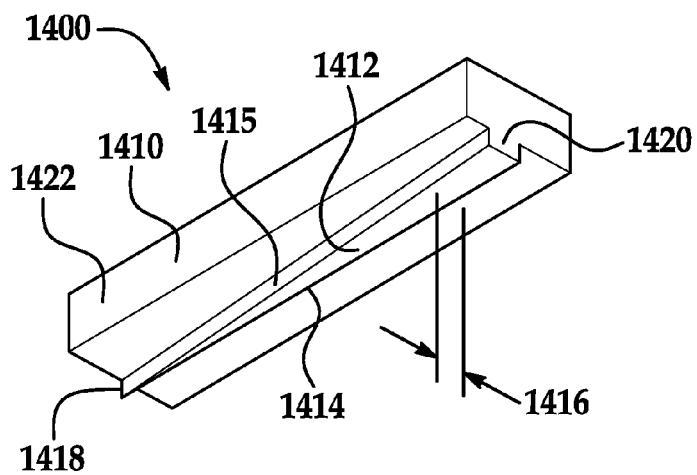
FIG. 9 is a perspective view of a disengagement device according to exemplary embodiments.

As shown in FIG. 9, the first disengagement device 1400 can include a base 1410 and a cam member 1412. The cam member 1412 can have a varying width 1416. For example, a leading end 1418 of the cam member 1412 can be narrower than the trailing end 1420. In other words, the width 1416 of the leading end 1418 can be less than that at the trailing end 1420. In some embodiments, the leading end 1418 can be pointed, and the width 1416 of the cam member 1412 can gradually increase along the length of the device 1400.

As shown in FIG. 8, the first disengagement device 1400 can be disposed in the conveyor belt 1000 in a fixed position such that the links 1144 advance toward the leading end 1418. As links 1144 advance along the cam member 1412, the cam member 1412 can be received within the gap 1159 (FIG. 5A) between the inner links 1170, 1172, 1174 and the respective outer links 1164, 1166, 1168. The side surfaces of the cam member 1412 (i.e., the cam surfaces 1414, 1415) can abut the links as they slide along the cam member 1412. As the links advance, the cam surfaces 1414, 1415 can push the inner links 1170, 1172, 1174 inward in the transverse direction 1144, away from the outer links 1164, 1166, 1168 to disengage the links.

In some embodiments represented in FIG. 8, the first disengagement device 1400 can comprise a first member 1422 as well as a second member 1424. The first member 1422 can be configured as illustrated in FIG. 9, and the second member 1424 can be a mirror image of the first member 1422. When installed in the conveyor belt 1000 as shown in FIG. 8, the first and second members 1422, 1424 can cooperate to disengage the links 1144 as the links 1144 advance in the longitudinal direction 1112.

Figure 10A:
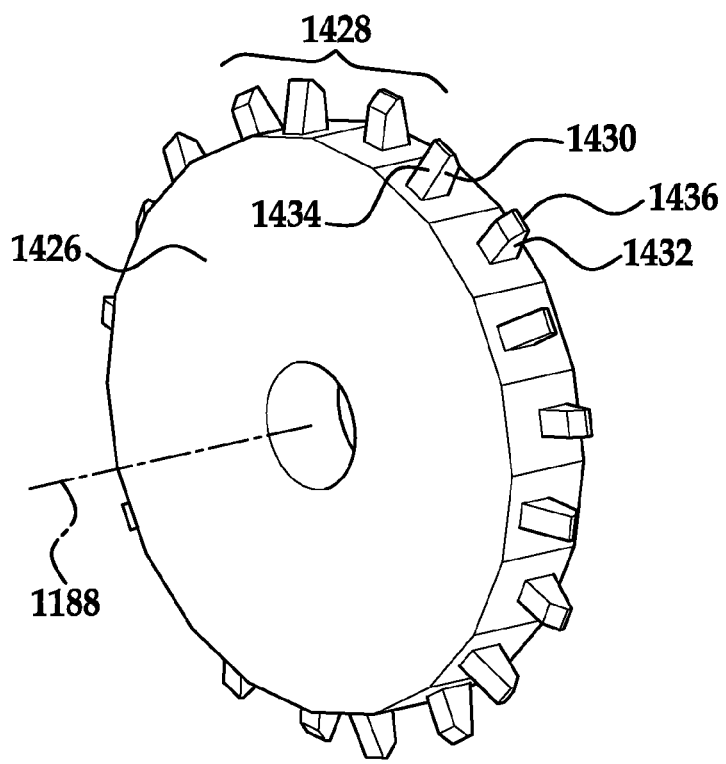
FIG. 10A is a perspective view of a disengagement device according to additional exemplary embodiments.
Figure 10B:
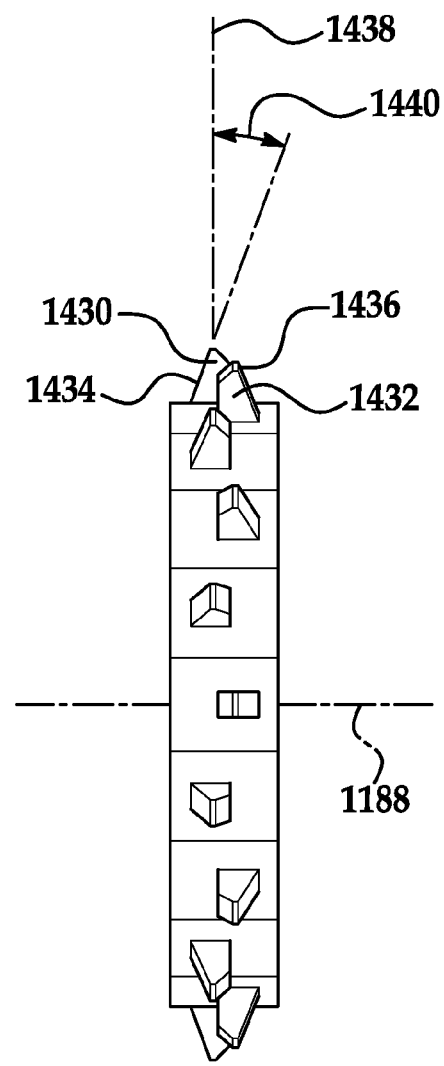
FIG. 10B is an end view of the disengagement device of FIG. 10A.

Furthermore, the second disengagement device 1402 of the conveyor belt 1000 can be configured as illustrated in FIGS. 10A and 10B. As shown, the device 1402 can include a rounded, disc-like base 1426 and a plurality of protrusions 1428. The protrusions 1428 can be spaced apart circumferentially about the base 1426, and the protrusions 1428 can protrude out radially from the base 1426. The plurality of protrusions 1428 can comprise a plurality of first protrusions 1430 and a plurality of second protrusions 1432. The first and second protrusions 1430, 1432 can be disposed in an alternating arrangement circumferentially about the base 1426. Additionally, the first protrusions 1430 can each include a first cam surface 1434, and the second protrusions 1432 can each include a second cam surface 1436. As shown in FIG. 10B, the first cam surface 1434 and the second cam surfaces 1436 can face in opposite directions. In some embodiments, the first cam surface 1434 can face substantially along the rotational axis 1188 of the device 1402, and the second cam surface 1436 can face in the opposite direction along the axis 1188. Also, the first cam surface 1434 can be disposed at an acute angle 1440 (i.e., a first acute angle) relative to a radial centerline 1438 of the base 1426. The second cam surface 1436 can also be disposed at an acute angle (i.e., a second acute angle) relative to the radial centerline 1438. In some embodiments, the first and second acute angles can be substantially equal, but opposite each other. In additional embodiments, the first and/or second cam surfaces 1434, 1436 can face at least partially along the circumferential direction about the device 1402. In still additional embodiments, the first and/or second cam surfaces 1434, 1436 can face at least partially in the radial direction. Furthermore, in some embodiments, the first and/or second cam surfaces 1434, 1436 can be substantially flat. In additional embodiments, the first and/or second cam surfaces 1434, 1436 can be contoured.

As shown in FIG. 8, the second disengagement device 1402 can be mounted for rotation about the axis of rotation 1188 as indicated by the arrow 1444. As the links 1444 advance toward the rotating second disengagement device 1402, the first and second cam surfaces 1434, 1436 can cam against and disengage the links 1144. For example, the first and second protrusions 1430, 1432 can move the inner links 1174, 1172 inward in the transverse direction 1114 away from the outer links 1168, 1166.

In some embodiments, the second disengagement device 1402 can drive the linkage assembly 1142 forward in the longitudinal direction 1112. For example, as the second disengagement device 1402 rotates, the first and/or second protrusions 1430, 1432 can push and advance the linkage assembly 1142 forward. In some embodiments, the protrusions 1430, 1432 can engage the links 1144 via friction such that rotation of the second disengagement device 1402 advances the linkage assembly 1142. In other embodiments, one or more of the protrusions 1430, 1432 can include a surface that faces forward in the longitudinal direction, which pushes forward on an opposing surface of the link 1144 to advance the linkage assembly 1142. Accordingly, the second disengagement device 1402 can be referred to as a driving mechanism that includes disengagement features for disengaging the linkage assembly 1142. In additional embodiments, the protrusions 1430, 1432 can push against the rods 1146 to advance the linkage assembly 1142 while maintaining the links 1144 in the disengaged position.

Therefore, the belt assembly 1102 can advance through a curved path about the axis 1188. Using the conveyor belt of FIG. 1 as an example, this can correspond to the travel of the belt assembly 102 through the second curved segment 128. Once the belt assembly 102 progresses through the second curved segment 128, the links can re-engage (e.g., due to the biasing force supplied by the biasing members 1300 shown in FIG. 3), and the belt assembly 102 can advance back through the second linear segment 120. Accordingly, the belt assembly 102 can support itself for travel through the second linear segment 120. The belt assembly 102 can then advance back through the first curved segment 126 and then through the first linear segment 118. Next, the links can disengage and advance through the third curved segment 130. Subsequently, the links 1144 can re-engage and the belt assembly 102 can support itself for travel through the first linear segment 118, and so on. Accordingly, the belt assembly of the present disclosure can continuously travel through both linear and curved segments.

Thus, because the belt assembly can be self-supported, the conveyor belt can be assembled using fewer parts. For example, the conveyor belt can include fewer supports than conveyor belts of the prior art. Also, in some embodiments, the conveyor belt can be operated more efficiently because friction on the belt assembly from support structures can be reduced. Furthermore, the conveyor belt can be more compact and modular because a support structure may not be needed.

Additionally, the configuration of the links 1144 described above can provide one or more advantages. For example, the links 1144 can be shaped and/or otherwise configured such that the links 1144 are sturdy and robust. The links 1144 can also be manufactured quickly and inexpensively.

Moreover, several links 1144 within the assembly 1102 can be symmetrical and/or reversible. For example, the outer link 1156a on the first side 1148 of the assembly 1102 can be inverted and used as an outer link 1156b on the second side 1150 of the assembly 1102. Similarly, the inner link 1158a on the first side 1148 of the assembly 1102 can be inverted and used as an inner link 1158b on the second side 1150 of the assembly 1102. Also, the outer links 1156a, 1156b can be the same part repeated in sequence along the longitudinal direction 1112, and the inner links 1158a, 1158b can also be the same part repeated in sequence along the longitudinal direction 1112. The belt assembly 1102 can also include a number of the same biasing members 1300 and rods 1146 throughout. Accordingly, manufacturing of the parts of the belt assembly 1102 can be completed efficiently, because the belt assembly 1102 can be formed from a number of the same parts.

Furthermore, the belt assembly 1102 can be repaired, cleaned, or otherwise serviced relatively easily as compared to conventional belts. Parts can be disassembled easily for these purposes. Also, in some embodiments, the links 1144 can remain assembled within the belt assembly 1102, and yet the links 1144 can move relative to other parts during a cleaning process or other servicing of the belt assembly 1102 for added convenience.

Referring now to FIGS. 11A-11E, additional embodiments of the belt assembly 2102 are illustrated. The belt assembly 2102 of FIGS. 11A-11E can include features that are similar to those of FIGS. 3-8. Instead of repeating the disclosure from above, differences between the embodiments will be highlighted. Corresponding components are identified in FIGS. 11A-11E with corresponding reference numbers increased by 1000.

As shown, the belt assembly 2102 can include a linkage assembly 2142 with a plurality of links 2144. The links 2144 can include a plurality of outer links 2156 and a plurality of inner links 2158. The outer links 2156 and the inner links 2158 can move between engaged and disengaged positions as will be discussed.

Figure 11A:
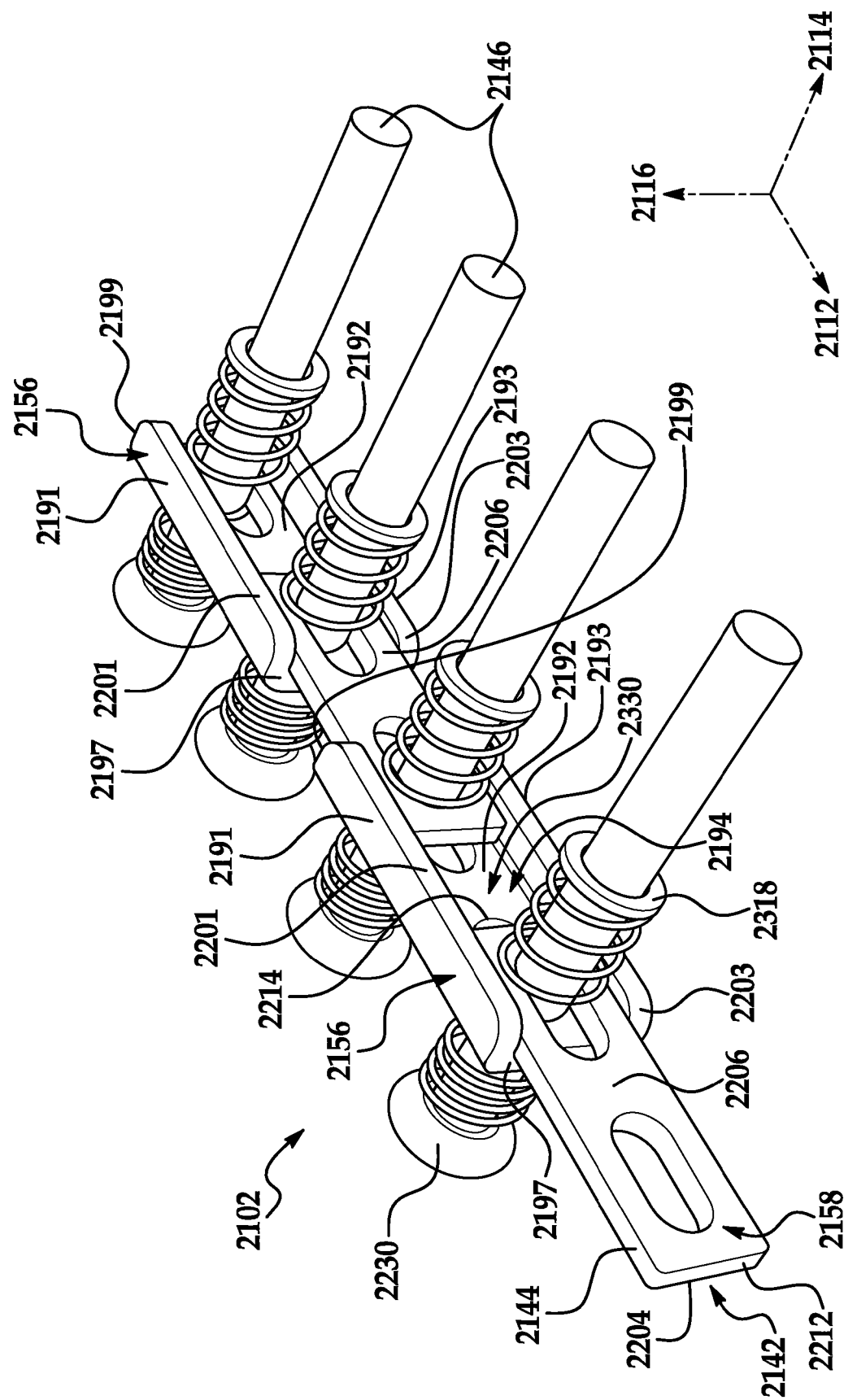
FIG. 11A is a perspective view of a linkage assembly of a conveyor belt according to additional embodiments of the present disclosure.
Figure 11B:
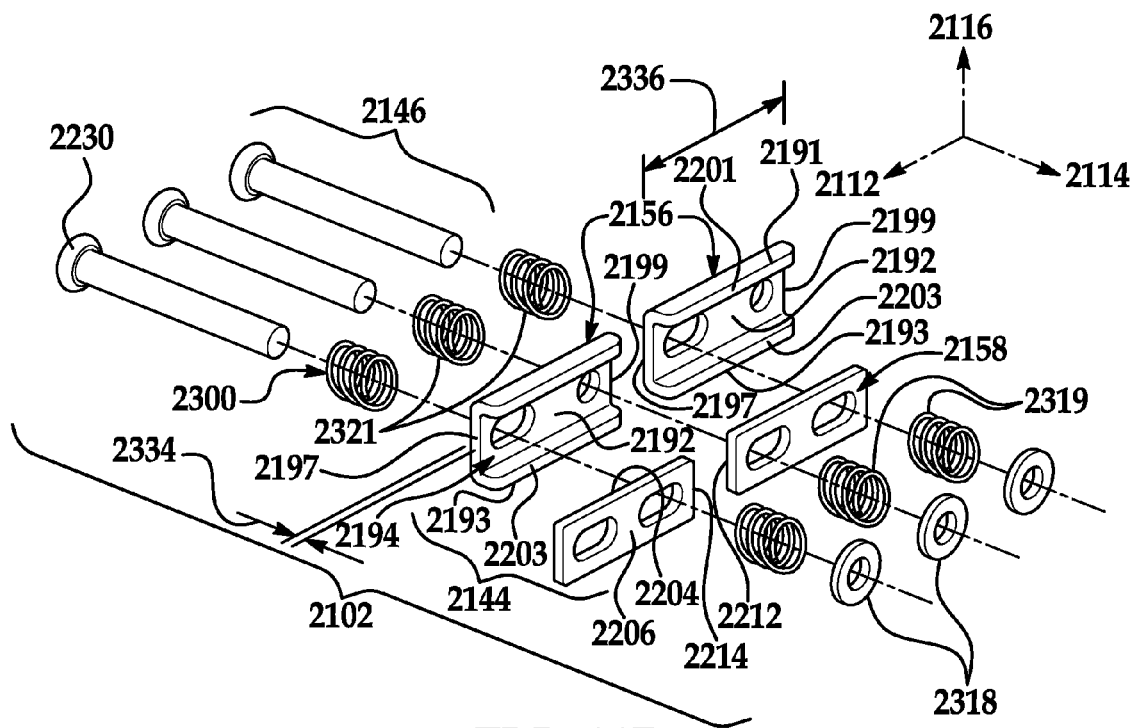
FIG. 11B is an exploded view of the linkage assembly of FIG. 11A.
Figure 11C:
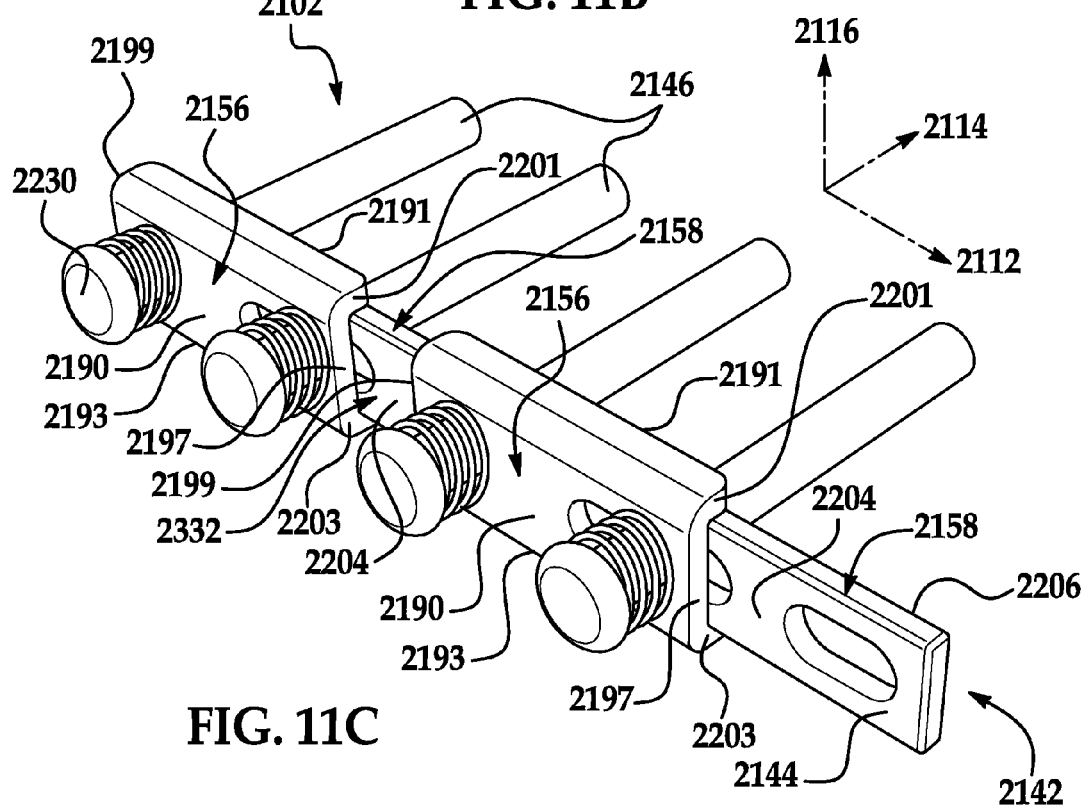
FIG. 11C is a perspective view of the linkage assembly of FIG. 11A taken from the opposite vantage.
Figure 11D:
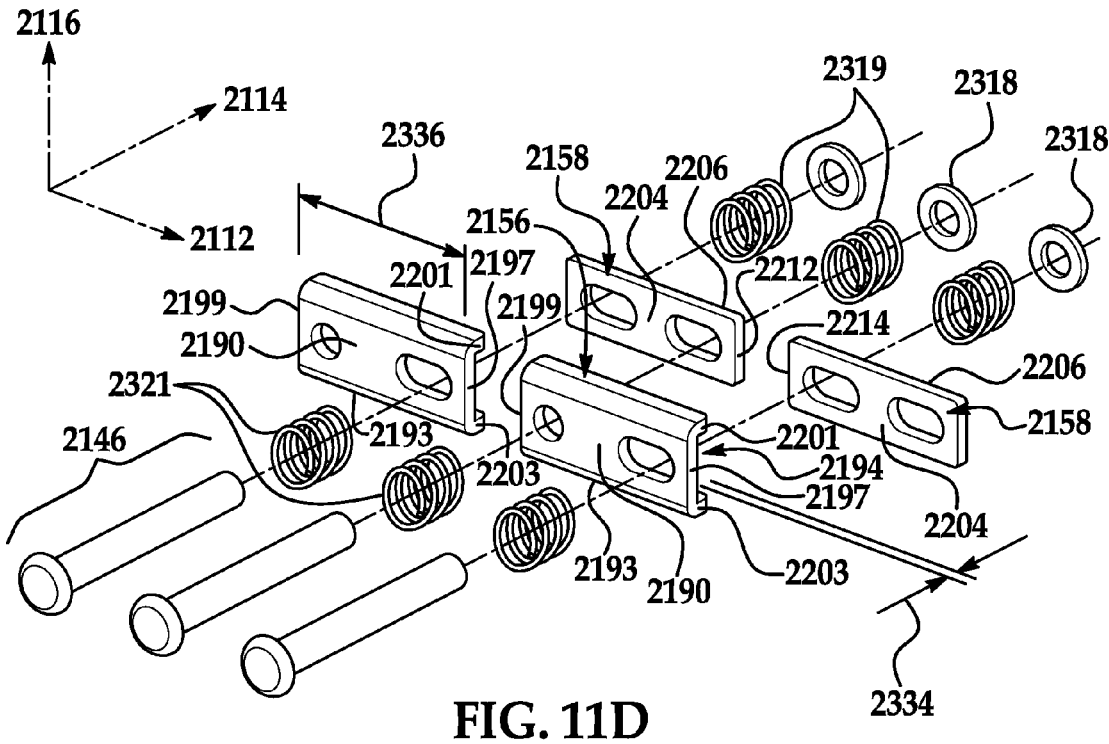
FIG. 11D is an exploded view of the linkage assembly of FIG. 11C.

As shown in FIGS. 11B and 11D, at least one outer link 2156 can include an outer face 2190, an inner face 2192, a top edge 2191, a bottom edge 2193, a forward edge 2197, and a rear edge 2199. In some embodiments, the outer link 2156 can have a substantially constant thickness 2334, which is measured between the outer face 2190 and the inner face 2192. Also, the outer link 2156 can include a first rail 2201 proximate the top edge 2191 and/or a second rail 2202 proximate the bottom edge 2193. In some embodiments, the top edge 2191 and the bottom edge 2193 of the outer link 2156 can extend inward in the transverse direction 2114 to define the rails 2201, 2203. For example, in some embodiments, the top edge 2191 and bottom edge 2193 can be bent inward to define the rails 2201, 2203. Also, in some embodiments, the first and/or second rail 2201, 2203 can extend along the majority of the length 2336 of the link 2156. Specifically, in some embodiments, the first and second rails 2201, 2203 can extend along substantially the entire length 2336. In other embodiments, the first and/or second rail 2201, 2203 can extend along only a portion of the length 2336.

Also, the inner links 2158 can include an outer face 2204, an inner face 2206, a top edge 2208, a bottom edge 2210, a forward edge 2212, and a rear edge 2214. In some embodiments, the inner links 2158 can have a substantially constant thickness and can be relatively thin and bar-like.

It will be appreciated that the outer and inner links 2156, 2158 can be formed in an efficient manner. For example, both links 2156, 2158 can include a plurality of relatively flat surfaces, and both can have substantially constant thickness, which can facilitate manufacture of the links 2156, 2158.

The outer and inner links 2156, 2158 can be interlocked with the rods 2146, similar to the embodiments discussed in detail above. Also, the linkage assembly 2142 can include a plurality of biasing members 2300. In some embodiments, the plurality of biasing members 2300 can include a plurality of inner biasing members 2319 and a plurality of outer biasing members 2321. The inner biasing members 2319 can be similar to the embodiments discussed above, and the inner biasing members 2319 can be retained on the rods 2146 via retainers 2318. Also, the outer biasing members 2321 can be disposed between the head 2230 of the rod 2146 and the outer face 2190 of the outer link 2156. In some embodiments, the outer biasing members 2321 can be a helical compression spring. Thus, the outer biasing member 2321 can bias the outer links 2156 inward toward the inner links 2158. Accordingly, the inner biasing members 2319 and the outer biasing members 2321 can collectively bias the links 2144 toward the engaged position.

When in the engaged position, the inner links 2158 can be at least partially received within at least one outer link 2156. For example, as shown in FIGS. 11A and 11C, at least one inner link 2158 can be received between the first and second rails 2201, 2203 of one outer link 2156 and also received between the first and second rails 2201, 2203 of a neighboring outer link 2156. Also, in some embodiments, the top edge 2208 of the inner link 2158 can abut opposing surfaces of the neighboring first rails 2201, and the bottom edge 2210 of the inner link 2158 can abut opposing surfaces of the neighboring second rails 2203. Furthermore, in the engaged position, the outer face 2204 of the inner link 2158 can abut the inner face 2192 of the adjacent outer links 2156.

In some embodiments, when the links 2144 are in the engaged position, the links 2144 can move (e.g., slide) in the longitudinal direction 2112 relative to each other. This movement can be limited, in some embodiments, by abutment between the forward edge 2197 of one outer link 2156 and the rear edge 2199 of an adjacent outer link 2156. Additionally, in some embodiments, this longitudinal movement can be limited by abutment between the forward edge 2212 of one inner link 2158 and the rear edge 2214 of an adjacent inner link 2158.

Accordingly, when the links 2144 are engaged, loads can be transferred through, distributed, and resisted by the linkage assembly 2142 as discussed above. Moreover, in the engaged position, the inner links 2158 can be constrained against rotation relative to the outer links 2156. For example, in some embodiments, the inner links 2158 can be constrained against rotation in both the clockwise and counter-clockwise directions about the axis of the rods 2146. As such, the belt assembly 2102 can support itself in areas in which the linkage assembly 2142 is in the engaged position.

Figure 11E:
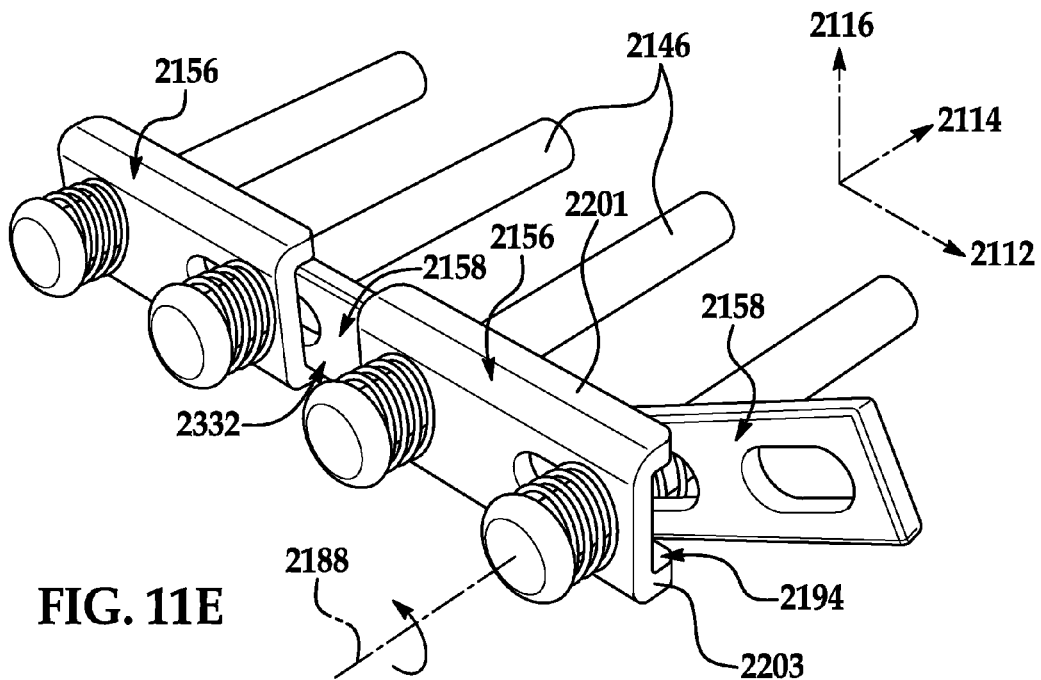
FIG. 11E is a perspective view of the linkage assembly wherein some links are shown in the engaged position and others are shown in the disengaged position.

As shown in FIG. 11E, the linkage assembly 2142 can move to a disengaged position. Specifically, the inner links 2158 can move inward in the transverse direction 2114 and/or the outer links 2156 can move outward in the transverse direction 2114 for disengagement. Once disengaged, the inner links 2158 can rotate relative to the outer links 2156 about the horizontal axis of rotation 2188.

In some embodiments, the linkage assembly 2142 can be disengaged by a device that is received within a gap between the outer and inner links 2156, 2158. For example, in the embodiments of FIG. 11E, the linkage assembly 2142 can include an outer gap 2332 provided between adjacent outer links 2156. A respective inner link 2158 can be exposed by the outer gap 2332. Thus, the exposed inner link 2158 can be pushed inward in the transverse direction 2114 to disengage the linkage assembly 2142. Additionally, in the embodiments of FIG. 11A, the linkage assembly 2142 can include an inner gap 2330 provided between adjacent inner links 2158. A respective outer link 2156 can be exposed by the inner gap 2330. Thus, the exposed outer link 2156 can be pushed outward in the transverse direction 2114 to disengage the linkage assembly 2142.

Referring now to FIGS. 12A-12C, additional embodiments of the belt assembly 3102 are illustrated. The belt assembly 3102 of FIGS. 12A-12C can include features that are similar to the embodiments discussed above. Instead of repeating the disclosure from above, differences between the embodiments will be highlighted. Components that correspond to those of FIGS. 3-8 are identified in FIGS. 12A-12C with corresponding reference numbers increased by 2000.

As shown, the belt assembly 3102 can include a linkage assembly 3142 with a plurality of links 3144. The links 3144 can include a plurality of outer links 3156 and a plurality of inner links 3158. The outer links 3156 and the inner links 3158 can move between engaged and disengaged positions as will be discussed. Also, for purposes of clarity, the belt assembly 3102 is shown without biasing members of the type discussed above. However, it will be appreciated that the belt assembly 3102 can include compression springs or other biasing members that bias the links 3144 toward the engaged position.

A representative outer link 3156 is shown in FIG. 12B according to exemplary embodiments. As shown, the outer link 3156 can be substantially similar to the outer links 2156 of FIGS. 11A-11E. As such, the outer links 3156 can include the first rail 3201 and the second rail 3203.

A representative inner link 3158 is shown in FIG. 12C according to exemplary embodiments. As shown, the inner link 3158 can include a third protrusion 3350 proximate the forward edge 3212 and a fourth protrusion 3352 proximate the rear edge 3214. Furthermore, in some embodiments, both the forward and rear apertures 3220, 3222 can be slots.

As shown in FIG. 12A, when the links 3144 are in the engaged position, the third protrusion 3350 can be received between the first and second rails 3201, 3203 of one outer link 3156, and the fourth protrusion 3352 can be received between the first and second rails 3201, 3203 of another outer link 3156. As such, surfaces of the third and fourth protrusions 3350, 3352 can abut against opposing surfaces of the first and second rails 3201, 3203. To disengage the links 3144, the inner links 3158 can be moved inward in the transverse direction 3114 and/or the outer links 3156 can be moved outward in the transverse direction 3114.

Referring to FIG. 13, the belt assembly 3102' is illustrated according to exemplary embodiments. The belt assembly 3102' can be substantially similar to the embodiments of FIGS. 12A-12C except as noted. Specifically, the third protrusion 3350' can include a transverse portion 3351' that extends outwardly in the transverse direction 3114' and a longitudinal portion 3353' that extends forward in the longitudinal direction 3312'. In some embodiments, the fourth protrusion 3352' can be shaped similarly to the third protrusion 3352' except that the fourth protrusion 3352' can extend outwardly and rearwardly in the longitudinal direction 3312'.

The belt assembly 3102' can engage and support itself, similar to the embodiments of FIG. 12A. Also, when in the engaged position, the inner links 3158' can slide in the longitudinal direction 3112' relative to the outer links 3156'. In some embodiments, this longitudinal movement can be limited by abutment between the fourth protrusion 3352' of one inner link 3158' and the third protrusion 3350' of an adjacent inner link 3158'. The belt assembly 3102' can move to the disengaged position similar to the embodiments discussed above.

Referring now to FIGS. 14A-14C, additional embodiments of the belt assembly 4102 are illustrated. The belt assembly 4102 of FIGS. 14A-14C can include features that are similar to the embodiments discussed above. Instead of repeating the disclosure from above, differences between the embodiments will be highlighted. Components that correspond to those of FIGS. 3-8 are identified in FIGS. 14A-14C with corresponding reference numbers increased by 3000.

As shown, the belt assembly 4102 can include a linkage assembly 4142 with a plurality of links 4144. The links 4144 can include a plurality of outer links 4156 and a plurality of inner links 4158. The outer links 4156 and the inner links 4158 can move between engaged and disengaged positions as will be discussed. Also, for purposes of clarity, the belt assembly 4102 is shown without biasing members of the type discussed above. However, it will be appreciated that the belt assembly 4102 can include compression springs or other biasing members that bias the links 4144 toward the engaged position.

A representative outer link 4156 is shown in FIG. 14B according to exemplary embodiments. As shown, the outer link 4156 can be substantially similar the outer links 2156 of FIGS. 11A-11E. As such, the outer links 4156 can include the first rail 4201 and the second rail 4203.

A representative inner link 4158 is shown in FIG. 14C according to exemplary embodiments. As shown, the inner link 4158 can include an outer face 4204, an inner face 4206, a top edge 4208, a bottom edge 4210, a forward end 4212, and a rear end 4214. The inner link 4158 can also include a forward aperture 4220 and a rear aperture 4222. In some embodiments, the forward and/or rear aperture 4220, 4222 can be rounded (e.g., circular) through-holes that extend through both the outer face 4204 and the inner face 4206.

Additionally, in some embodiments, the inner link 4158 can be rounded proximate the forward end 4212 and/or the rear end 4214. More specifically, in some embodiments, the inner link 4158 can include a first rounded end 4213 and a second rounded end 4215. In some embodiments, the first rounded end 4213 can be semi-circular and substantially coaxial with the forward aperture 4220, and/or the second rounded end 4215 can be semi-circular and substantially coaxial with the rear aperture 4222.

Furthermore, in some embodiments, the inner link 4158 can include an upper protrusion 4209 proximate the top edge 4208 and/or a lower protrusion 4211 proximate the bottom edge 4210. The upper protrusion 4209 can protrude upward in the vertical direction 4116, and the lower protrusion 4211 can protrude downward in the vertical direction 4116.

As shown in FIG. 14A, when the links 4144 are in the engaged, self-supporting position, the first rounded end 4213 can be received between the first and second rails 3201, 3203 of one outer link 3156, and the second rounded end 4215 can be received between the first and second rails 3201, 3203 of an adjacent outer link 3156. As such, abutment between the surfaces of the rounded ends 4213, 4215 and the adjacent outer links 3156 can inhibit rotation about the horizontal axis of rotation 4188.

Furthermore, when in the position of FIG. 14A, the inner link 4158 can abut against the adjacent outer link 4156 to resist and oppose forces directed in the longitudinal direction 4112. For example, in some embodiments, the upper protrusion 4209 of the inner link 4158 can abut the first rail 4201 of the outer link 4156, and the lower protrusion 4211 of the inner link 4158 can abut the second rail 4203 of the outer link 4156.

To disengage the links 4144, the inner links 4158 can be moved inward in the transverse direction 4114 relative to the outer links 4156. Also, in some embodiments, the outer links 4156 can be moved outward in the transverse direction 4114 relative to the inner links 4158 as discussed above.

Furthermore, as shown in FIG. 14A, the inner link 4158 can move in the longitudinal direction 4112 between a retracted position and an extended position. (The extended position is shown in phantom according to exemplary embodiments.) In the retracted position, the upper protrusion 4209 of the inner link 4158 can abut the first rail 4201 of the outer link 4156, and the lower protrusion 4211 of the inner link 4158 can abut the second rail 4203 of the outer link 4156. In the extended position, the upper protrusion 4209 can be spaced apart from the first rail 4201, and the lower protrusion 4211 can be spaced apart from the second rail 4203.

Figure 15A:
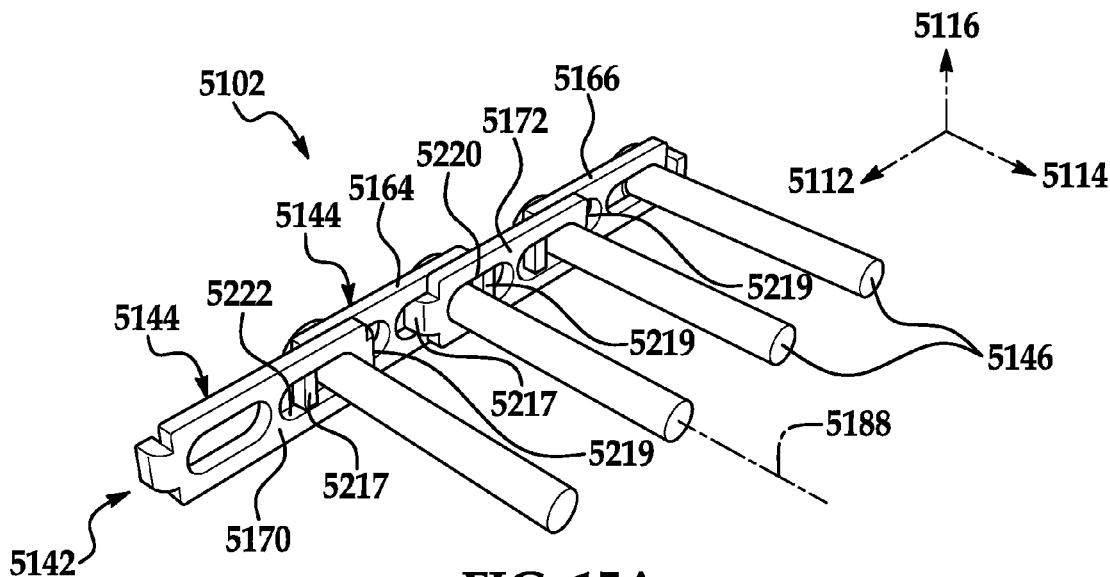
FIG. 15A is a perspective view of a linkage assembly according to additional embodiments of the present disclosure.
Figure 15B:
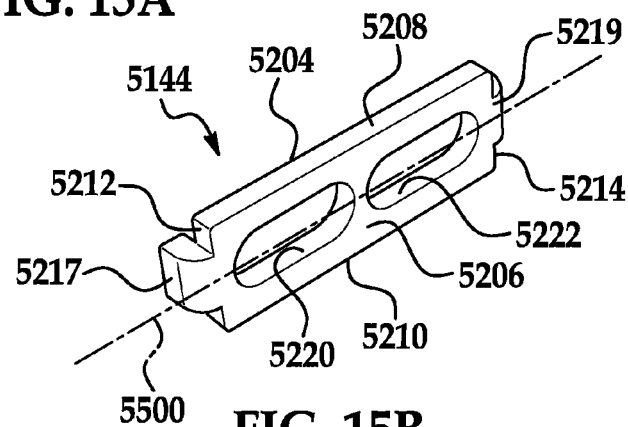
FIG. 15B is a perspective view of a link of the linkage assembly of FIG. 15A.

Referring now to FIGS. 15A-15B, additional embodiments of the belt assembly 5102 are illustrated. The belt assembly 5102 of FIGS. 15A-15B can include features that are similar to the embodiments discussed above. Instead of repeating the disclosure from above, differences between the embodiments will be highlighted. Components that correspond to those of FIGS. 3-8 are identified in FIGS. 15A-15B with corresponding reference numbers increased by 4000.

As shown, the belt assembly 5102 can include a linkage assembly 5142 with a plurality of links 5144. Also, for purposes of clarity, the belt assembly 5102 is shown without biasing members of the type discussed above. However, it will be appreciated that the belt assembly 5102 can include compression springs or other biasing members that bias the links 5144 toward the engaged position.

An exemplary link 5144 is shown independently in FIG. 15B. The links 5144 can include a first face 5204, a second face 5206, a top edge 5208, a bottom edge 5210, a forward edge 5212, and a rear edge 5214. Also, the links 5144 can include a forward aperture 5220 and a rear aperture 5222. In some embodiments, the forward 5220 and/or rear apertures 5222 can be elongated slots.

Furthermore, the links 5144 can include a first protrusion 5217 proximate the forward edge 5212 and second protrusion 5219 proximate the rear edge 5214. In some embodiments, the first protrusion 5217 can protrude from the forward edge 5212 and away from the first face 5204. Additionally, the second protrusion 5219 can protrude from the rear edge 5214 and away from the first face 5204.

In some embodiments, the link 5144 can be substantially symmetrical. Stated differently, in some embodiments represented in FIG. 15B, the link 5144 can have an imaginary line of symmetry 5500. In the embodiment illustrated, the line of symmetry 5550 extends between the forward edge 5212 and the rear edge 5214 and substantially parallel to the longitudinal direction 5112. As shown in the embodiment of FIG. 15B, the link 5144 can also be symmetrical about a line of symmetry extending in the vertical direction 5116 and the transverse direction 5114.

As shown in FIG. 15A, the plurality of links 5144 within the linkage assembly 5142 can be substantially similar to each other. However, some of the links 5144 can be inverted relative to the others. More specifically, some of the links 5144 can be arranged with the protrusions 5217, 5219 protruding inward in the transverse direction 5114, and other links 5144 can be arranged with the protrusions 5217, 5219 protruding outward in the transverse direction 5114. Those links 5144 with protrusions 5217, 5219 protruding inward can be referred to as outer links, and those links 5144 with protrusions 5217, 5219 protruding outward can be referred to as inner links. Accordingly, as shown in FIG. 15A, the plurality of links 5144 can include a first outer link 5164, a second outer link 5166, a first inner link 5170, and a second inner link 5172.

The engaged position of the linkage assembly 5142 will be discussed in relation to the first outer link 5164. As shown in FIG. 15A, the first protrusion 5217 of the first outer link 5164 can be received within the aperture 5222 of the first inner link 5170 and the second protrusion 5219 can be received within the aperture 5220 of the second inner link 5172. The protrusions 5217, 5219 of the second outer link 5166 can be received in the apertures 5220, 5222 of neighboring inner links in a similar manner. Likewise, the first protrusion 5217 of the second inner link 5172 can be received within the aperture 5220 of the first outer link 5164, and the second protrusion 5219 of the second inner link 5172 can be received within the aperture 5222 of the second outer link 5166. The protrusions 5217, 5219 of the first inner link 5170 can be received in the apertures 5220, 5222 of neighboring outer links in a similar manner.

In some embodiments, the protrusions 5217, 5219 can move within the respective apertures 5220, 5222 when in the engaged position. For example, the protrusions 5217, 5219 can slide within the apertures 5220, 5222 along the longitudinal direction 5112. As such, the rods 5146 can move relative to each other along the longitudinal direction 5112.

When in the engaged position, abutment between the protrusions 5217, 5219 and the inner surfaces of the apertures 5220, 5222 can limit rotation about a horizontal axis (e.g., the axis 5188). Accordingly, the belt assembly 5102 can support itself when in the engaged position.

To disengage the links 5144, the inner links 5170, 5172 can move inward in the transverse direction 5114 relative to the outer links 5164, 5166. Specifically, the protrusions 5217, 5219 can move outside the respective apertures 5220, 5222. As such, the links 5144 can rotate about the axis 5188.

Figure 16:
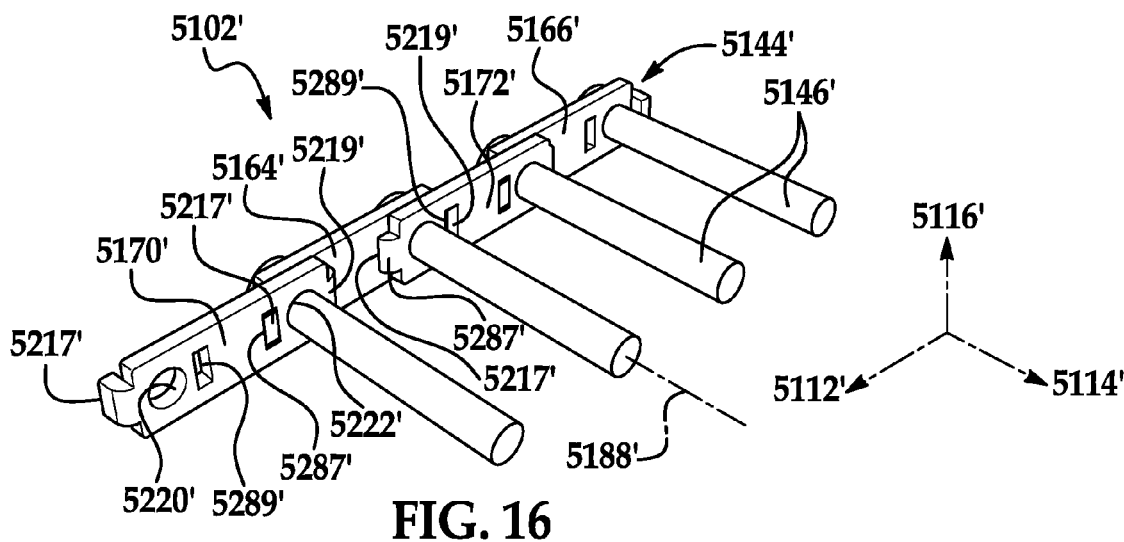
FIG. 16 is a perspective view of a linkage assembly according to additional embodiments of the present disclosure.

Referring now to FIG. 16, a variation of the embodiments of the belt assembly 5102' is illustrated. The belt assembly 5102' can be substantially similar to the embodiments of FIGS. 15A-15B. However, the apertures 5220', 5222' can correspond to the shape of the rods 5146'. For example, the apertures 5220', 5222' can be circular to correspond to the rods 5146' to limit movement of the link 5144' relative to the rods 5146' in the longitudinal direction 5112' and the vertical direction 5116'.

The links 5144' can also include a first receptacle 5287' and a second receptacle 5289'. In some embodiments, the first receptacle 5287' can be a through-hole that extends through both the first face 5204' and the second face 5206'. Also, in some embodiments, the first receptacle 5287' can correspond in shape to the first protrusion 5217' and the second receptacle 5289' can correspond in shape to the second protrusion 5219'. For example, the first receptacle 5287' can include a plurality of substantially planar surfaces, and the first protrusion 5217' can include corresponding planar surfaces. In some embodiments, for example, the first receptacle 5287' can be a rectangular through-hole that is sized and shaped according to that of the first protrusion 5217'. Likewise, the second receptacle 5289' can be a rectangular through-hole that is sized and shaped according to that of the second protrusion 5219'.

When in the engaged, self-supporting position, the first receptacle 5287' can receive a first protrusion 5217' of one adjacent link 5144', and the second receptacle 5289' can receive a second protrusion 5217' of another adjacent link 5144'. Specifically, in the embodiment of FIG. 16, the first protrusion 5217' of the outer link 5164' can be received in the first receptacle 5287' of the first inner link 5770', and the second protrusion 5219' of the outer link 5164' can be received in the second receptacle 5289' of the second inner link 5772'. Accordingly, the first protrusion 5217' and the corresponding first receptacle 5287' can define a male-female coupling, and the opposing surfaces of this coupling can inhibit relative rotation of the links 5144' about the axis 5188'. Also, this coupling can inhibit the link 5144' from rotating relative to one or more rods 5146'. Furthermore, this coupling can inhibit movement of the links 5144' in the longitudinal direction 5112 relative to each other.

To disengage the links 5144', at least two links 5144' can move away from each other in the transverse direction 5144'. For example, the first and second inner links 5170', 5172' can move inward and away from the first and second outer links 5164', 5166' in the transverse direction 5114' to move to the disengaged position.

Referring now to FIGS. 17A-17B, additional embodiments of the belt assembly 6102 are illustrated. The belt assembly 6102 of FIGS. 17A-17B can include features that are similar to the embodiments discussed above. Instead of repeating the disclosure from above, differences between the embodiments will be highlighted. Components that correspond to those of FIGS. 3-8 are identified in FIGS. 17A-17B with corresponding reference numbers increased by 5000.

As shown, the belt assembly 6102 can include a linkage assembly 6142 with a plurality of links 6144. Also, for purposes of clarity, the belt assembly 6102 is shown without biasing members of the type discussed above. However, it will be appreciated that the belt assembly 6102 can include compression springs or other biasing members that bias the links 6144 toward the engaged position.

An exemplary link 6144 is shown independently in FIG. 17B. The links 6144 can include a first face 6204, a second face 6206, a top edge 6208, a bottom edge 6210, a forward edge 6212, and a rear edge 6214. Also, the links 6144 can include a forward aperture 6220 and a rear aperture 6222. In some embodiments, the forward 6220 and/or rear apertures 6222 can be elongated slots.

Furthermore, the links 6144 can include a first rail 6201 and a second rail 6203. The first rail 6201 can extend from the top edge 6208. The first rail 6201 can project in the transverse direction 6114, away from the first face 6204 of the link 6144. Also, the first rail 6201 can extend along only a portion of the length 6336 of the top edge 6208 of the link 6144. In some embodiments, the first rail 6201 can be disposed closer to the forward edge 6212 than the rear edge 6214. Also, in some embodiments, the first rail 6201 can be disposed over the forward aperture 6220. The second rail 6203 can be substantially similar to the first rail 6201, except that the second rail 6203 can extend from the bottom edge 6210 of the link 6144.

As shown in FIG. 17A, the plurality of links 6144 within the linkage assembly 6142 can be substantially similar to each other. However, some of the links 6144 can be inverted relative the others. More specifically, some of the links 6144 can be arranged with the rails 6201, 6203 extending inward in the transverse direction 6114, and other links 6144 can be arranged with the rails 6201, 6203 extending outward in the transverse direction 6114. Those links 6144 with rails 6201, 6203 extending inward can be referred to as outer links, and those links 6144 with rails 6201, 6203 extending outward can be referred to as inner links. Accordingly, as shown in FIG. 17A, the plurality of links 6144 can include a first outer link 6164, a second outer link 6166, a first inner link 6170, and a second inner link 6172.

When in the engaged position of FIG. 17A, portions of one link 5144 can be received between the first and second rails 6201, 6203 of the next successive link 5144. As such, the top edge 6208 and bottom edge 6210 can abut against the opposing surfaces of the first and second rails 6201, 6203, respectively. Specifically, the first outer link 6164 can be received by the first inner link 6170, and the first outer link 6164 can also receive the second inner link 6172.

In this engaged, self-supporting position, the links 6164, 6166, 6170, 6172 can be constrained against rotation about the horizontal axis 6188. Also, in this position, the links 6164, 6166, 6170, 6172 can move (e.g., slide) relative to each other in the longitudinal direction 6112.

To disengage the linkage assembly 6142, the inner links 6170, 6172 can move inward in the transverse direction 6114 relative to the outer links 6164, 6166. Specifically, the inner links 6170, 6172 can move outside from between the respective first and second rails 6201, 6203. Once disengaged, the links 6170, 6172, 6164, 6166 can rotate about the axis 6188 relative to each other.

Referring now to FIGS. 18A and 18B, additional embodiments of the belt assembly 6102' are illustrated. The belt assembly 6102' of FIGS. 18A-18B can include features that are similar to the embodiments of FIGS. 17A-17B. Instead of repeating the disclosure from above, differences between the embodiments will be highlighted.

An exemplary link 6144' is shown independently in FIG. 18B. As shown, the link 6144' can be substantially similar to the link 6144 of FIG. 17B, except that the link 6144' can include a first portion 6552', a second portion 6554', and an intermediate portion 6556'. The first portion 6552' can include the forward edge 6212'. Also, the first and second rails 6201', 6203' can extend from the first portion 6552'. The second portion 6554' can include the rear edge 6214'. Moreover, the intermediate portion 6556' can extend between the first and second portions 6552', 6554'.

In some embodiments, the first portion 6552' and the second portions 6554' can both be substantially planar, but the first portion 6552' and the second portion 6554' can be spaced apart in the transverse direction 6114'. For example, the first portion 6552' can be spaced outwardly in the transverse direction 6114' relative to the second portion 6554'. The intermediate portion 6556' can extend between and join the first and second portions 6552', 6554'. In some embodiments, the intermediate portion 6556' can curve between the first and second portions 6552', 6554'.

As shown in FIG. 18A, the plurality of links 6144' within the linkage assembly 6142' can be substantially similar to each other. Also, the links 6144' can each be oriented with the respective first and second rails 6201', 6203' extending inward in the transverse direction 6114'. Specifically, a first link 6560', a second link 6562', a third link 6564', and a fourth link 6566' are shown for purposes of discussion.

The first, second, and third links 6560', 6562', 6564' are shown in the engaged position according to exemplary embodiments. The fourth link 6566' is shown in the disengaged position according to exemplary embodiments.

The engaged position is described, for example, with respect to the second link 6562'. As shown, the second link 6562' can receive the second portion 6554' of the third link 6564'. Stated differently, the second portion 6554' of the third link 6564' can be received between the first rail 6201', the first portion 6552', and the second rail 6203' of the second link 6562'. Also, the second portion 6554' of the second link 6562' can be similarly received by the first link 6560'. Accordingly, the second link 6562' can be constrained against rotation relative the first and third links 6560', 6564'. The remaining links 6144' can be similarly configured.

Moreover, in the engaged position, the links 6144' can slide relative to each other in the longitudinal direction 6112' between a retracted position and an extended position as indicated by arrow 6568'. For example, the first link 6560' is shown in a retracted position relative to the second link 6562'. In contrast, the second link 6562' is shown in an extended position relative to the third link 6564'. As represented by the first link 6560', the intermediate portion 6556' can abut the rear edge 6214' of the second link 6562' when in the retracted position. This abutment can limit the longitudinal sliding of the first link 6560' toward the second link 6562'. The remaining links 6144' can be similarly configured.

To disengage the links 6144', at least one link can move in the transverse direction 6114' relative to the next successive link. For example, as shown in FIG. 18A, the fourth link 6566' can move inward in the transverse direction 6114' relative to the third link 6564' as indicated by arrow 6570'. Accordingly, the fourth link 6555' can rotate about the axis 6188' relative to the third link 6564'.

Figure 19A:
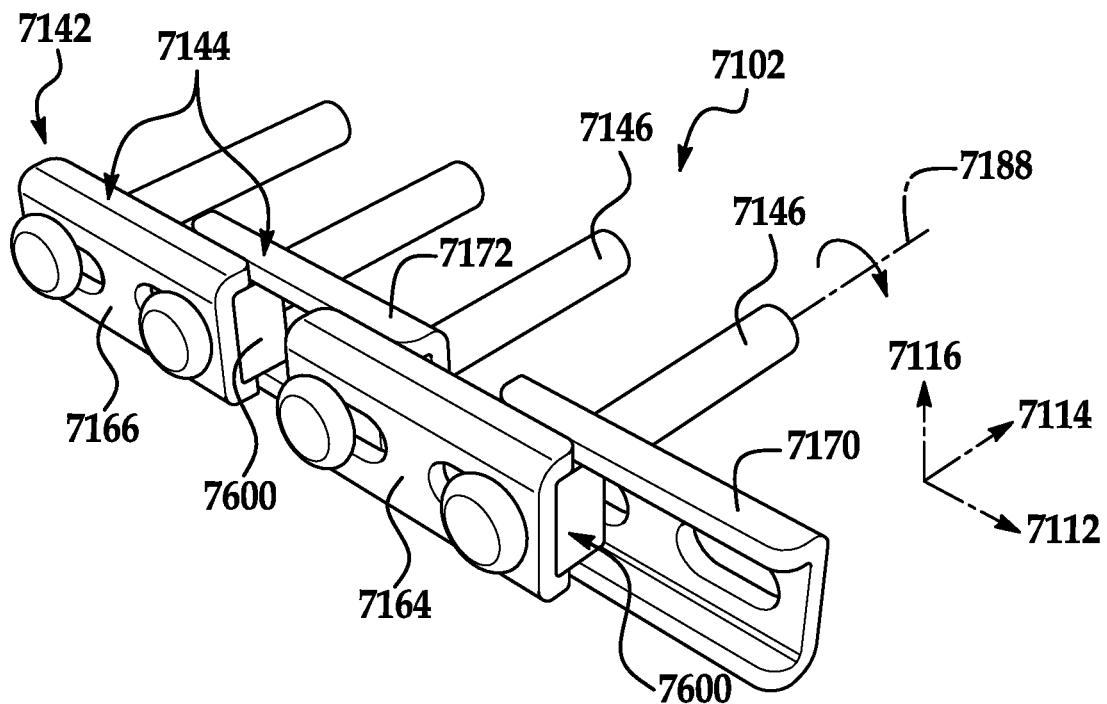
FIG. 19A is a perspective view of a linkage assembly according to additional embodiments of the present disclosure.
Figure 19B:
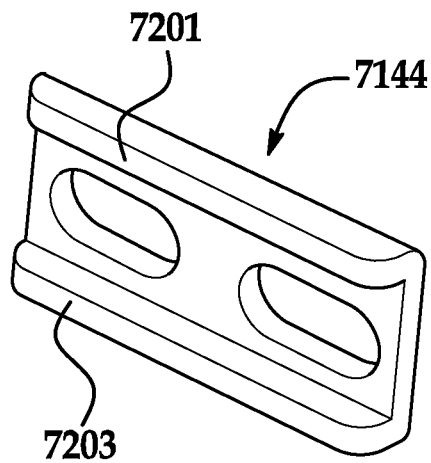
FIG. 19B is a perspective view of a link of the linkage assembly of FIG. 19A.
Figure 19C:
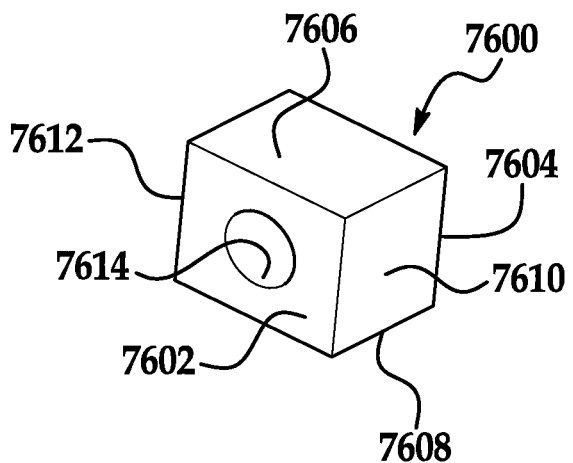
FIG. 19C is a perspective view of an intermediate member of the linkage assembly of FIG. 19A.

Referring now to FIGS. 19A-19C, additional embodiments of the belt assembly 7102 are illustrated. The belt assembly 7102 of FIGS. 19A-19C can include features that are similar to the embodiments discussed above. Instead of repeating the disclosure from above, differences between the embodiments will be highlighted. Components that correspond to those of FIGS. 3-8 are identified in FIGS. 19A-19B with corresponding reference numbers increased by 6000.

As shown, the belt assembly 7102 can include a linkage assembly 7142. For purposes of clarity, the belt assembly 7102 is shown without biasing members of the type discussed above. However, it will be appreciated that the belt assembly 7102 can include compression springs or other biasing members for biasing the linkage assembly 7142 toward the engaged position.

As shown in FIGS. 19A and 19B, the linkage assembly 7142 can include a plurality of links 7144. A single exemplary link 7144 is shown independently in FIG. 19B. The links 7144 can be substantially similar to those of discussed above in relation to FIGS. 12B and 14B in some embodiments. As shown in FIG. 19A, the plurality of links 7144 within the linkage assembly 7142 can be substantially similar to each other. However, some of the links 7144 can be inverted relative to others. More specifically, some of the links 7144 can be arranged with the rails 7201, 7203 extending inward in the transverse direction 7114, and other links 7144 can be arranged with the rails 7201, 7203 extending outward in the transverse direction 7114. Those links 7144 with rails 7201, 7203 extending inward can be referred to as outer links, and those links 7144 with rails 7201, 7203 extending outward can be referred to as inner links. Accordingly, as shown in FIG. 19A, the plurality of links 7144 can include a first outer link 7164, a second outer link 7166, a first inner link 7170, and a second inner link 7172.

The linkage assembly 7142 can additionally include one or more intermediate members 7600. Generally, when the linkage assembly 7142 is in the engaged position, different portions of the intermediate member 7600 can be received by respective links 7144 to engage those links 7144. Stated differently, two different links 7144 can be engaged and constrained against relative rotation via the intermediate member 7600.

An exemplary intermediate member 7600 is illustrated in FIG. 19C according to some embodiments. As shown, the intermediate member 7600 can include an outer surface 7602, an inner surface 7604, a top surface 7606, a bottom surface 7608, a forward surface 7610, and a rear surface 7612. In some embodiments, each of these surfaces can be substantially planar. Thus, in some embodiments, the intermediate member 7600 can be cubic in shape. Furthermore, the intermediate member 7600 can include an aperture 7614, such as a through-hole that extends through both the outer surface 7602 and the inner surface 7604.

As shown in FIG. 19A, the intermediate member 7600 can receive a respective rod 7146 through the aperture 7614. Also, the intermediate member 7600 can be disposed between at least two links 7144. For example, an exemplary intermediate member 7600 can be disposed between the first outer link 7164 and the first inner link 7170. When the linkage assembly 7142 is in the engaged position of FIG. 19A, the intermediate member 7600 can engage both the outer link 7164 and the inner link 7170. More specifically, the intermediate member 7600 can be received by the outer link 7164 between its first and second rails 7201, 7203 and also received by the inner link 7170 between its first and second rails 7201, 7203. As such, the outer and inner link 7164, 7170 can be engaged via the intermediate member 7600 and prevented from rotating relative to each other about the axis 7188. The other links 7144 and intermediate members 7600 can be similarly configured.

In some embodiments, to disengage the linkage assembly 7142, the inner links 7170, 7172 can be moved inward in the transverse direction 7114 away from the intermediate members 7600 and the outer links 7164, 7166. The inner links 7170, 7172 can move inward such that the intermediate members 7600 no longer engage the rails 7201, 7203, allowing the links 7164, 7166, 7170, 7172 to rotate relative to each other (e.g., about the axis 7188).

Referring now to FIGS. 20A-20D, the belt assembly 8102 is illustrated according to additional embodiments. The embodiments of FIGS. 20A-20D can include features that are similar to the embodiments of FIGS. 17A-17B. Instead of repeating the disclosure from above, differences between the embodiments will be highlighted. Components that correspond to those of FIGS. 17A-17B are identified in FIGS. 20A-20D with corresponding reference numbers increased by 2000.

As shown, the belt assembly 8102 can include a linkage assembly 8142 with a plurality of links 8144. An exemplary link 8144 is shown independently in FIG. 20D. The links 8144 can be interconnected with the rods 8146, substantially as described above in regard to FIGS. 17A-17B. As shown in FIGS. 20A and 20B, the plurality of links 8144 can include a first outer link 8164, a second outer link 8166, and an inner link 8172.

The linkage assembly 8142 can also include at least one bearing link 8700. An exemplary bearing link 8700 is shown independently in FIG. 20C according to some embodiments. Generally, the bearing link 8700 can be interconnected with adjacent rods 8146 and can also bear loads from the adjacent rods 8146. In some embodiments, the bearing link 8700 can facilitate disengagement of the links 8144, for example, when the belt assembly 8102 is under a tension load directed in the longitudinal direction 8112.

As shown in FIG. 20C, the bearing link 8700 can include an outer surface 8702 and an inner surface 8704. The bearing link 8700 can also have a substantially constant thickness 8706 measured between the outer and inner surfaces 8702, 8704. Thus, in some embodiments, the bearing link 8700 can be a substantially flat bar. Additionally, the bearing link 8700 can include a first aperture 8710 and a second aperture 8712. In some embodiments, the first and/or second apertures 8710, 8712 can be elongate slots.

As shown in FIGS. 20A and 20B, when the bearing link 8700 is assembled in the linkage assembly 8742, the first aperture 8710 can receive one rod 8146, and the second aperture 8712 can receive an adjacent rod 8146. Accordingly, the bearing link 8700 can interconnect adjacent pairs of the rods 8146. Also, in some embodiments, the bearing link 8700 can be disposed proximate the second face 8206 of at least one outer link 8144. For example, the second surface 8704 can lie against and abut the second face 8206 of the first outer link 8164 as well as the second face 8206 of the second outer link 8164.

During operation, the belt assembly 8102 may be subject to a tension load represented by the arrow 8750 and the arrow 8752. The bearing link 8700 can receive this tension load and hold the belt assembly 8102 in tension. However, the links 8144 can remain free to move between the engaged position and the disengaged positions. This is because the bearing link 8700 can have a shorter pitch than the links 8144. Accordingly, the bearing links 8700 can hold the belt assembly 8102 in tension while the inner link 8172 moves inwardly in the transverse direction 8114 to disengage from the outer links 8164, 8166.

Figure 21:
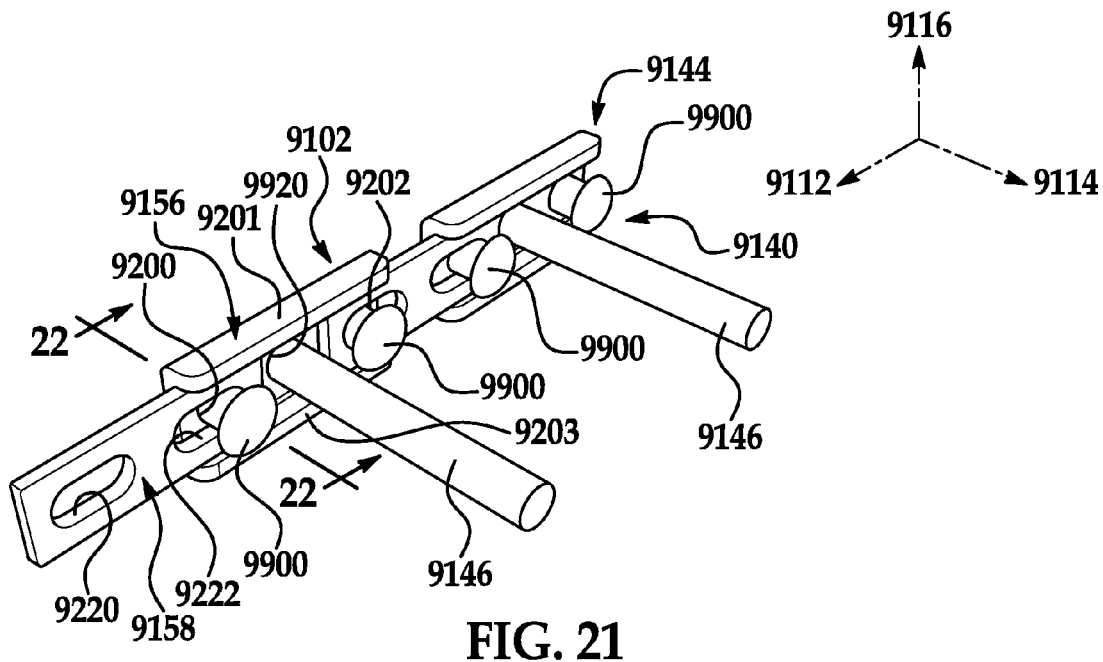
FIG. 21 is a perspective view of the linkage assembly according to additional embodiments of the present disclosure.
Figure 22:
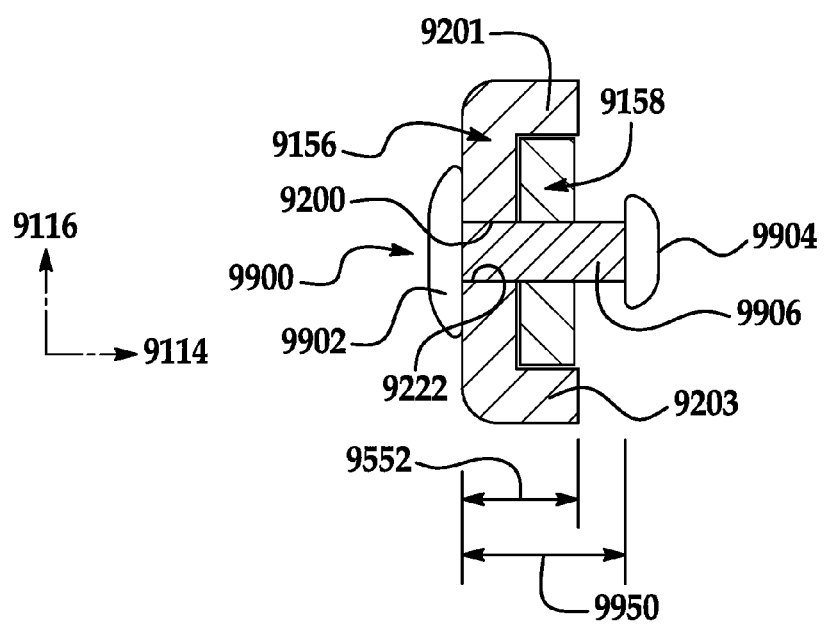
FIG. 22 is a section view of the linkage assembly taken along the line 22-22 of FIG. 21.

Referring now to FIGS. 21 and 22, additional embodiments of the belt assembly 9102 are illustrated. The embodiments of FIGS. 21 and 22 can include features that are similar to the embodiments of FIGS. 11A-11E. Instead of repeating the disclosure from above, differences between the embodiments will be highlighted. Components that correspond to those of FIGS. 11A-11E are identified in FIGS. 21 and 22 with corresponding reference numbers increased by 7000.

As shown, the belt assembly 9102 can include a linkage assembly 9142 with a plurality of links 9144. The plurality of links 9144 can include a plurality of outer links 9156 and a plurality of inner links 9158. The links 9156, 9158 can be interconnected by a plurality of transverse elements 9140. In some embodiments, the transverse elements 9140 can include a plurality of rods 9146. In some embodiments, the plurality of transverse elements 9140 can also include a plurality of link connectors 9900.

As shown in FIG. 22, the link connectors 9900 can extend through at least one inner link 9158 and at least one outer link 9156 for interconnecting the links 9156, 9158. In some embodiments, the link connector 9900 can include first end 9200, a second end 9204, and an intermediate portion 9906. The intermediate portion 9906 can extend through the links 9156, 9158. In some embodiments, the first end 9200 and the second end 9204 can be enlarged to retain the links 9156, 9158 together. Also, in some embodiments, the link connector 9900 can be welded to one of the links 9156, 9158. In some embodiments, the link connector 9900 can be a rivet-type fastener.

As shown in FIG. 21, at least one link connector 9900 can extend through the rear aperture 9222 of the respective inner link 9158 and through the forward aperture 9200 of the respective outer link 9156. Other link connectors 9900 can extend through the forward aperture 9220 of the inner link 9158 and through the rear aperture 9202 of the respective outer link 9156.

In some embodiments, the intermediate portion 9906 of the connector 9900 can have a length 9950. The length 9950 can be greater than a combined thickness 9552 of the outer and inner links 9156, 9158. As such the links 9156, 9158 can move relative to each other in the transverse direction 9114 as will be discussed.

Additionally, in some embodiments illustrated in FIG. 21, the outer links 9156 can include an intermediate aperture 9920 that receives a respective rod 9146. The intermediate aperture 9920 can be disposed between the respective forward aperture 9200 and the respective rear aperture 9202. In some embodiments, the intermediate aperture 9920 can be a round (e.g., circular) hole that receives rod 9146 to attach the outer link 9156 to the rod 9146. In additional embodiments (not illustrated), the inner links 9158 can be configured to attach to the rods 9146.

Accordingly, the links 9156, 9158 can be interconnected with the rods 9146 and the link connectors 9900. In some embodiments, the links 9156, 9158 can move relative to each other in the longitudinal direction 9112 when interconnected. Also, in some embodiments, the links 9156, 9158 can move relative to each other in the transverse direction 9114. For example, the inner links 9158 can move inward in the transverse direction 9114, away from the outer links 9156. In additional embodiments, the outer links 9156 can move outward in the transverse direction 9114 away from the inner links 9158.

In some embodiments, the inner link 9158 can be received between the first and second rails 9201, 9203 of the outer link 9156 when in the engaged position. Also, when moving to the disengaged position, the inner link 9158 can move inward in the transverse direction 9114 away from the outer link 9156. As represented in FIG. 22, the increased length 9950 of the link connector 9900 can allow this transverse movement of the inner link 9158.

In summary, the belt assembly of the conveyor belt of the present disclosure can be self-supporting. As such, at least one segment of the conveyor belt can support itself without an underlying support structure. However, the belt assembly can disengage and move away from the self-supporting position, for example, to navigate curved segments of the conveyor belt. This can increase the usefulness and modularity of the conveyor belt. Furthermore, the conveyor belt of the present disclosure may provide cost savings, increase manufacturing efficiency, and/or reduce assembly time. This is because fewer parts may be necessary as compared to conveyor belts of the prior art.

The foregoing description of the embodiments has been provided for purposes of illustration and description. It is not intended to be exhaustive or to limit the present disclosure. Individual elements or features of a particular embodiment are generally not limited to that particular embodiment, but, where applicable, are interchangeable and can be used in a selected embodiment, even if not specifically shown or described. The same may also be varied in many ways. Additionally, positions of some features can be reversed from those disclosed above. For example, a pairing of an "inner link" and an "outer link" can be reversed such that the inner link is disposed proximate the outer side of the conveyor belt assembly and such that the outer link is disposed closer to the centerline of the belt assembly. Such variations are not to be regarded as a departure from the present disclosure, and all such modifications are intended to be included within the scope of the present disclosure.

What is claimed is:

1. A conveyor belt comprising:
a self-supporting linkage assembly;
a plurality of transverse elements configured to travel along a longitudinal direction, the plurality of transverse elements being interconnected by the linkage assembly; and
a biasing member;
the linkage assembly comprising a first link and a second link, the first and second links configured to move relative to each other between an engaged position and a disengaged position;
the biasing member configured to bias the first and second links toward the engaged position;
wherein the first and second links, when in the engaged position, are constrained against rotation relative to each other about at least one axis of rotation; and
wherein the first and second links, when in the disengaged position, are configured to rotate relative to each other about the at least one axis of rotation.

2. The conveyor belt of claim 1, wherein the first link includes a first surface and the second link includes a second surface;
wherein the first surface and the second surface engage each other when in the engaged position.

3. The conveyor belt of claim 2, wherein at least one of the first surface and the second surface is substantially planar.

4. The conveyor belt of claim 2, wherein the first link is at least partially received within the second link when in the engaged position such that the first and second surfaces engage each other.

5. The conveyor belt of claim 2, wherein the linkage assembly extends along the longitudinal direction, the transverse elements extend along a transverse direction, and the conveyor belt defines a vertical direction that is perpendicular to the longitudinal direction and the transverse direction;

wherein the first surface and the second surface abut when in the engaged position to support a load directed in the vertical direction.

6. The conveyor belt of claim 2, wherein the linkage assembly extends along the longitudinal direction, the transverse elements extend along a transverse direction, and the conveyor belt defines a vertical direction that is perpendicular to the longitudinal direction and the transverse direction;
   wherein the first surface and the second surface abut when in the engaged position to support a load directed in the longitudinal direction.

7. The conveyor belt of claim 1, wherein the linkage assembly further comprises an intermediate member;
   wherein the intermediate member includes a first engagement portion that engages with the first link when in the engaged position;
   wherein the intermediate member includes a second engagement portion that engages with the second link when in the engaged position.

8. The conveyor belt of claim 1, wherein the first link includes a first aperture and the second link includes a second aperture; and
   wherein at least one of the transverse elements is received within the first aperture and the second aperture to interconnect the first link and the second link.

9. The conveyor belt of claim 8, wherein at least one of the first aperture and the second aperture is a slot, and wherein the at least one of the transverse elements is configured to move within the slot.

10. The conveyor belt of claim 1, wherein the biasing member includes a helical compression spring.

11. The conveyor belt of claim 1, wherein the linkage assembly extends along the longitudinal direction and the transverse elements extend along a transverse direction;
   wherein the at least one axis of rotation extends along the transverse direction.

12. The conveyor belt of claim 1, wherein the linkage assembly extends along the longitudinal direction and the transverse elements extend along a transverse direction;
   wherein the first and second links are configured to move substantially in the transverse direction between the engaged position and the disengaged position.

13. The conveyor belt of claim 1, further comprising a disengagement device configured to move the first and second links away from the engaged position and toward the disengaged position against a biasing force from the biasing member.

14. The conveyor belt of claim 13, wherein the disengagement device includes a cam surface that cams and abuts against a surface of the first link to disengage the first link from the second link.

15. The conveyor belt of claim 13, further comprising a driving member that drives the conveyor belt in the longitudinal direction, the driving member including the disengagement device.

16. The conveyor belt of claim 1, further comprising a driving member that drives the conveyor belt in the longitudinal direction.

17. The conveyor belt of claim 1, wherein the first link has substantially the same shape as the second link, and
   wherein the first link is inverted relative to the second link.

18. The conveyor belt of claim 1, wherein the first link and the second link, in the engaged position, are configured to:
   rotate relative to each other about a first axis of rotation; and
   be constrained against rotation relative to each other about a second axis of rotation;
   wherein the first axis of rotation is substantially perpendicular to the second axis of rotation.

19. The conveyor belt of claim 1, wherein the first and second link, in the engaged position, are configured to move relative to each other along the longitudinal direction.

20. The conveyor belt of claim 1, wherein at least one of the first and second links defines an imaginary line of symmetry, and wherein the at least one of the first and second links is substantially symmetrical with respect to the line of symmetry.

21. The conveyor belt of claim 1, wherein the first and second links, when in the engaged position, are constrained against rotation relative to each other in both a clockwise direction and a counter-clockwise direction about the at least one axis of rotation.

22. The conveyor belt of claim 1, further comprising a bearing link;
   wherein the plurality of transverse elements include a first transverse element and a second transverse element;
   wherein the bearing link interconnects the first and second transverse elements;
   wherein the bearing link is configured to bear a tension load applied between the first and second transverse elements while the first and second links move relative to each other between the engaged position and the disengaged position.

23. The conveyor belt of claim 1, wherein the first link includes a base, a first rail that projects away from the base, and a second rail that projects away from the base, wherein the first link defines an opening between the base and the first and second rails;
   wherein the second link, in the engaged position, is received within the opening and abuts at least one of the first and second rails; and
   wherein the second link, in the disengaged position, is disposed outside the opening.

24. The conveyor belt of claim 23, wherein the second link includes an end and an edge that extends away from the end;
   wherein the edge includes a protrusion;
   wherein, in the engaged position, the end of the second link is received within the opening and the protrusion is configured to abut one of the first and second rails.

25. The conveyor belt of claim 1, wherein the first link includes a first aperture and a receptacle;
   wherein the second link includes a second aperture and a projection;
   wherein the plurality of transverse elements includes a rod that is received in both the first aperture and the second aperture;
   wherein, in the engaged position, the projection is received in the receptacle to constrain the first and second links against rotation relative to each other about the at least one axis of rotation; and
   wherein, in the disengaged position, the projection is disposed outside the receptacle.

26. The conveyor belt of claim 1, wherein the first link includes a first aperture;
   wherein the second link includes a second aperture and a protrusion;
   wherein the plurality of transverse elements includes a rod that is received in both the first aperture and the second aperture;
   wherein, in the engaged position, the protrusion is received in the first aperture to constrain the first and second links against rotation relative to each other about the at least one axis of rotation; and wherein, in the disengaged position, the protrusion is disposed outside the aperture.

27. The conveyor belt of claim 1, wherein the first link includes a first portion, a second portion, and an intermediate portion that extends between the first and second portions;

wherein the intermediate portion curves between the first and second portion;

wherein, in the engaged position, the second link is received by the first portion of the first link to constrain the first and second links against relative rotation; and wherein, in the disengaged position, the second link is spaced apart from the first portion of the first link to allow the first and second links to rotate relative to each other.

28. The conveyor belt of claim 1, further comprising a link connector that attaches the first link to the second link;

wherein at least one of the first and second links moves relative to the link connector when moving between the engaged position and the disengaged position.

29. The conveyor belt of claim 1, wherein at least one of the transverse elements is fixed to at least one of the first link and the second link.

30. The conveyor belt of claim 1, wherein at least one of the transverse elements is fixed to the biasing member.

31. The conveyor belt of claim 1, wherein the biasing member is integrally connected to one of the first link and the second link.

32. A conveyor belt that defines a longitudinal direction, a transverse direction, and a vertical direction, the conveyor belt comprising:

a self-supporting linkage assembly;

a plurality of transverse elements that extend along the transverse direction, the transverse elements configured to travel along the longitudinal direction, the plurality of transverse elements being interconnected by the linkage assembly; and a biasing member;

the linkage assembly comprising a first link and a second link, the first link including a first support surface that faces substantially in the vertical direction, the second link including a second support surface that faces substantially in the vertical direction and opposite the first support surface, the first and second link configured to move relative to each other between an engaged position and a disengaged position;

wherein, in the engaged position, the first support surface abuts the second support surface to constrain the first and second links against rotation relative to each other about an axis of rotation, the axis of rotation extending in the transverse direction;

wherein, in the disengaged position, the first support surface is spaced apart from the second support surface to allow the first and second links to rotate relative to each other about the axis of rotation; and wherein the biasing member is configured to bias the first and second links toward the engaged position.

33. The conveyor belt of claim 32, wherein at least one of the first and second support surfaces is at least partially planar and normal to the vertical direction.

34. The conveyor belt of claim 33, wherein both the first and second surfaces are at least partially planar and normal to the vertical direction.

35. The conveyor belt of claim 32, wherein the first link includes a base, a first protrusion, and a second protrusion, the first and second protrusions protruding from the base, the first protrusion including the first support surface; and wherein, in the engaged position, the second link is received between the first and second protrusions.

36. The conveyor belt of claim 32, wherein the second link moves substantially in the transverse direction when moving between the engaged position and the disengaged position.

37. The conveyor belt of claim 32, wherein the first link includes a first aperture and the second link includes a second aperture;

wherein at least one of the transverse elements is received within the first aperture and the second aperture to interconnect the first link and the second link;

wherein the at least one of the transverse elements is configured to move within at least one of the first and second apertures.

38. The conveyor belt of claim 32, further comprising a disengagement device configured to move the first and second links away from the engaged position and toward the disengaged position against a biasing force from the biasing member.

39. The conveyor belt of claim 32, wherein the first link has substantially the same shape as the second link, and wherein the first link is inverted relative to the second link.

40. The conveyor belt of claim 32, wherein the first and second link, in the engaged position, are configured to move relative to each other along the longitudinal direction.

41. The conveyor belt of claim 32, wherein at least one of the first and second links defines an imaginary line of symmetry, and wherein the at least one of the first and second links is substantially symmetrical with respect to the line of symmetry.

42. The conveyor belt of claim 32, wherein the first and second links, when in the engaged position, are constrained against rotation relative to each other in both a clockwise direction and a counter-clockwise direction about the axis of rotation.

43. The conveyor belt of claim 32, wherein at least one of the transverse elements is fixed to at least one of the first link and the second link.

44. The conveyor belt of claim 32, wherein at least one of the transverse elements is fixed to the biasing member.

45. The conveyor belt of claim 32, wherein the biasing member is integrally connected to one of the first link and the second link.

* * * * *